US012677856B2

(12) United States Patent
Shi

(10) Patent No.: US 12,677,856 B2
(45) Date of Patent: Jul. 14, 2026

(54) FLAVORING COMPOSITIONS OF IMPROVING PLANT-BASED MEAT FLAVOR, METHOD OF MAKING AND APPLICATION THEREOF

(71) Applicant: Weiyue Shi, Beijing (CN)

(72) Inventor: Weiyue Shi, Beijing (CN)

(73) Assignee: Weiyue Shi, Beijing (CH)

( * ) Notice: Subject to any disclaimer, the term of this patent is extended or adjusted under 35 U.S.C. 154(b) by 0 days.

(21) Appl. No.: 18/562,026

(22) PCT Filed: Sep. 30, 2022

(86) PCT No.: PCT/CN2022/123036
§ 371 (c)(1),
(2) Date: Nov. 17, 2023

(87) PCT Pub. No.: WO2023/178980
PCT Pub. Date: Sep. 28, 2023

(65) Prior Publication Data
US 2025/0221436 A1 Jul. 10, 2025

(51) Int. Cl.
*A23L 27/21* (2016.01)
*A23J 3/22* (2006.01)
*A23L 27/00* (2016.01)

(52) U.S. Cl.
CPC ............. *A23L 27/215* (2016.08); *A23J 3/227* (2013.01); *A23L 27/84* (2016.08); *A23L 27/86* (2016.08)

(58) Field of Classification Search
None
See application file for complete search history.

(56) References Cited

U.S. PATENT DOCUMENTS

| | | | | |
|---|---|---|---|---|
| 2019/0343155 A1* | 11/2019 | Shi | ......................... | A21D 2/181 |
| 2020/0060310 A1* | 2/2020 | Schmidt | ................... | A23L 5/10 |

FOREIGN PATENT DOCUMENTS

| | | |
|---|---|---|
| CN | 111838402 | 10/2020 |
| CN | 112205605 | 1/2021 |
| WO | 2022112593 | 6/2022 |

OTHER PUBLICATIONS

International Search Report and Written Opinion for PCT Application No. PCT/CN2022/123036 Mailed on Dec. 21, 2022.

* cited by examiner

*Primary Examiner* — Jyoti Chawla
(74) *Attorney, Agent, or Firm* — Michael Ye

(57) ABSTRACT

The disclosure relates to flavoring compositions of improving plant-based meat flavor, method of making and method of use thereof. Specifically, the flavoring compositions comprises added Maillard reaction products and plant-based meat product. A flavour of the plant-based meat product can be improved through the addition of flavour products obtained from Maillard reaction.

8 Claims, 9 Drawing Sheets

SI 741, RSI 760, mainlib, Entry# 137568, CAS# NA, 1-(3,5-Dimethylthiophen-2-yl)-2-hydroxyethanone 08-2 #13209 RT: 23.91 AV: 1 AV: 5 SB: 12 13202-13207 13211-13216 NL: 3.10E7
F: + c EI Full ms [45.00-250.00]

08-2 #2473 RT: 5.29 AV: 1 AV: 5 SB: 12 2466-2471 2475-2480 NL: 1.01E7
F: + c EI Full ms [45.00-250.00]

SI 863, RSI 894, replib, Entry# 13184, CAS# 13678-67-6, Furfuryl sulfide

FLAVORING COMPOSITIONS OF IMPROVING PLANT-BASED MEAT FLAVOR, METHOD OF MAKING AND APPLICATION THEREOF

This application is a U.S. National Stage Entry of PCT International Application No. PCT/CN2022/123036, filed Sep. 30, 2022. The entirety of the aforementioned application is incorporated herein by reference.

FIELD

The present disclosure relates generally to flavoring agents, and their use in plant-based meat products.

BACKGROUND

The Oxford Learner's Dictionary defines "veganism" as "the practice of not eating or using any animal products, including meat, milk, leather, wool, etc." (Oxford Learner's Dictionary online). The popularity of veganism around the world has been growing rapidly since it was first introduced in 1944 (Statista Research Department, 2020). In the USA alone, the sales value of vegan or vegetarian food grew in 2017 approximately 23% over the previous year and stood at 2 billion USD. This rising demand is linked to the possible human health benefits, animal welfare concerns, and environmental considerations of veganism over the normal diet (Bryony et al., 2013). This brought the creation of meat analogues, or meat substitutes (Sadler, 2004), which aim to mock the nutrition value, texture, appearance, and other attributes of authentic meat (Kumar et al., 2014).

The market has offered several attempts to achieve the goal of mocking the various attributes of meat, with a range of flavourings, lipids, binding agents, and colouring agents being used (Kyriakopoulou, Keppler and van der Goot, 2021). However, most plant-based meat products still share similar defects in their flavour, including the beany and astringent flavour associated with plant proteins due to substances phenols. These off-flavours can act as barriers preventing the consumption of plant-based meat (Roland et al., 2017).

SUMMARY

The inventors of the present application have surprisingly discovered that a new alternative solution that occurs with authentic meat as well as a range of thermally treated foods the Maillard reaction. Accordingly, there is need for using such compositions to overcome the disadvantages associated with plant-based meat and provide improved flavoring compositions for the food and feed industry. Further, the inventors discovered that a new meaty flavor composition comprising an Mailard reaction product (MRP) and optional a plant-based meat product or aunthentic meat product, which can be added to food, beverage or wine to provide a decreased or eliminated off-taste which is any one of a bitter taste, a licorice-like taste, a metallic taste, an adverse taste, an astringent taste, a delayed sweetness onset, a lingering sweet aftertaste, and the like; or to endow food or beverage or wine with characteristic meat, burnt, roasted, caramellic, or chocolate taste profiles.

In one aspect, the present application relates to a flavor composition comprising added Maillard reaction products, as well as methods for making and using such compositions to improve the taste and/or flavor of the plant-based meat product.

In another aspect, the present application is directed to a meaty flavor or meaty flavored food or beverage or wine, preferably plant-based meat product, comprising added MRPs in an amount of 0.1-99.9 wt % of the composition.

In another aspect, a meaty flavor or meaty flavored food or beverage or wine, preferably plant-based meat product, comprising:

(1) optional a plant-based meat product and (2) an added Maillard reaction product (MRP) formed from a Maillard reaction mixture comprising:

(a) one or more sugar donors; and (b) one or more amine donors having a free amino group, wherein (a) and (b) undergo Maillard reaction in the absence of the plant-based meat product, wherein the MRP is present in the plant-based meat composition in a concentration range of 0.0001-10 wt % of the plant-based meat composition, and wherein (a) and (b) undergo the Maillard reaction at a temperature in the range of 60° C. to 250° C., preferably not more than 150° C., more preferably not more than 120° C., further preferably not more than 100° C.

In another aspect, a method for improving the taste profile of a meaty flavor or meaty flavored food or beverage or wine, preferably plant-based meat product, comprising: adding a Maillard reaction product (MRP) composition during preparation of the meaty flavor or meaty flavored food or beverage or wine, preferably plant-based meat product, to produce a final product, wherein the MRP composition is produced by heating a reaction mixture comprising:

(a) one or more sugar donor; and (b) one or more amine donors comprising a free amino group, wherein (a) and (b) undergo a Maillard reaction, preferably the reaction temperature is not more than 100 centigrade.

In some embodiments, the meaty flavor or meaty flavored food or beverage or wine, preferably plant-based meat product, further comprises one or more high intensity sweeteners.

In some embodiments, the meaty flavor or meaty flavored food or beverage or wine, preferably plant-based meat product, further comprises one or more high intensity natural sweeteners.

Another aspect of the present application relates to a meaty flavor or meaty flavored food or beverage or wine, preferably plant-based meat product, comprising one or more added MRP composition in this invention in a total amount of 0.00001-99.9 wt %.

In another aspect, the present application provides a method for modifying a plant-based meat product, comprising adding to the plant-based product one or more MRPs at a final concentration ranging from 0.0001 wt % to 99.9999 wt %, 0.0001 wt % to 99 wt %, 0.0001 wt % to 98 wt %, 0.0001 wt % to 97 wt %, 0.0001 wt % to 96 wt %, 0.0001 wt % to 95 wt %, 0.0001 wt % to 94 wt %, 0.0001 wt % to 93 wt %, 0.0001 wt % to 92 wt %, 0.0001 wt % to 91 wt %, 0.0001 wt % to 90 wt %, 0.0001 wt % to 89 wt %, 0.0001 wt % to 88 wt %, 0.0001 wt % to 87 wt %, 0.0001 wt % to 86 wt %, 0.0001 wt % to 85 wt %, 0.0001 wt % to 84 wt %, 0.0001 wt % to 83 wt %, 0.0001 wt % to 82 wt %, 0.0001 wt % to 81 wt %, 0.0001 wt % to 80 wt %, 0.0001 wt % to 79 wt %, 0.0001 wt % to 78 wt %, 0.0001 wt % to 77 wt %, 0.0001 wt % to 76 wt %, 0.0001 wt % to 75 wt %, 0.0001 wt % to 74 wt %, 0.0001 wt % to 73 wt %, 0.0001 wt % to 72 wt %, 0.0001 wt % to 71 wt %, 0.0001 wt % to 70 wt %, 0.0001 wt % to 69 wt %, 0.0001 wt % to 68 wt %, 0.0001 wt % to 67 wt %, 0.0001 wt % to 66 wt %, 0.0001 wt % to 65 wt %, 0.0001 wt % to 64 wt %, 0.0001 wt % to 63 wt %, 0.0001 wt % to 62 wt %, 0.0001 wt % to 61 wt %, 0.0001 wt % to 60 wt %, 0.0001 wt % to 59 wt %, 0.0001 wt % to 58 wt %, 0.0001 wt % to 57 wt %, 0.0001 wt % to 56 wt %, 0.0001 wt % to 55 wt %, 0.0001 wt % to 54 wt %, 0.0001 wt % to 53 wt %, 0.0001 wt % to 52 wt %, 0.0001 wt % to 51 wt %, 0.0001 wt % to 50 wt %, 0.0001 wt % to 49 wt %, 0.0001 wt % to 48 wt %, 0.0001 wt % to 47 wt %, 0.0001 wt % to 46 wt %, 0.0001 wt % to 45 wt %, 0.0001 wt % to 44 wt %, 0.0001 wt % to 43 wt %, 0.0001 wt % to 42 wt %, 0.0001 wt % to 41 wt %, 0.0001 wt % to 40 wt %, 0.0001 wt % to 39 wt %, 0.0001 wt % to 38 wt %, 0.0001 wt % to 37 wt %, 0.0001 wt % to 36 wt %, 0.0001 wt % to 35 wt %, 0.0001 wt % to 34 wt %, 0.0001 wt % to 33 wt %, 0.0001 wt % to 32 wt %, 0.0001 wt % to 31 wt %, 0.0001 wt % to 30 wt %, 0.0001 wt % to 29 wt %, 0.0001 wt % to 28 wt %, 0.0001 wt % to 27 wt %, 0.0001 wt % to 26 wt %, 0.0001 wt % to 25 wt %, 0.0001 wt % to 24 wt %, 0.0001 wt % to 23 wt %, 0.0001 wt % to 22 wt %, 0.0001 wt % to 21 wt %, 0.0001 wt % to 20 wt %, 0.0001 wt % to 19 wt %, 0.0001 wt % to 18 wt %, 0.0001 wt % to 17 wt %, 0.0001 wt % to 16 wt %, 0.0001 wt % to 15 wt %, 0.0001 wt % to 14 wt %, 0.0001 wt % to 13 wt %, 0.0001 wt % to 12 wt %, 0.0001 wt % to 11 wt %, 0.0001 wt % to 10 wt %, 0.0001 wt % to 9 wt %, 0.0001 wt % to 8 wt %, 0.0001 wt % to 7 wt %, 0.0001 wt % to 6 wt %, 0.0001 wt % to 5 wt %, 0.0001 wt % to 4 wt %, 0.0001 wt % to 3 wt %, 0.0001 wt % to 2 wt %, 0.0001 wt % to 1 wt %, 0.0001 wt % to 0.9 wt %, 0.0001 wt % to 0.8 wt %, 0.0001 wt % to 0.7 wt %, 0.0001 wt % to 0.6 wt %, 0.0001 wt % to 0.5 wt %, 0.0001 wt % to 0.4 wt %, 0.0001 wt % to 0.3 wt %, 0.0001 wt % to 0.2 wt %, 0.0001 wt % to 0.1 wt %, 0.0001 wt % to 0.09 wt %, 0.0001 wt % to 0.08 wt %, 0.0001 wt % to 0.07 wt %, 0.0001 % to 0.06 wt %, 0.0001 wt % to 0.05 wt %, 0.0001 wt % to 0.04 wt %, 0.0001 wt % to 0.03 wt %, 0.0001 wt % to 0.02 wt %, 0.0001 wt % to 0.01 wt %, 0.0001 wt % to 0.009 wt %, 0.0001 wt % to 0.008 wt %, 0.0001 wt % to 0.007 wt %, 0.0001 wt % to 0.006 wt %, 0.0001 wt % to 0.005 wt %, 0.0001 wt % to 0.004 wt %, 0.0001 wt % to 0.003 wt %, 0.0001 wt % to 0.002 wt %, 0.0001 wt % to 0.001 wt %, 0.0001 wt % to 0.0009 wt %, 0.0001 wt % to 0.0008 wt %, 0.0001 wt % to 0.0007 wt %, 0.0001 wt % to 0.0006 wt %, 0.0001 wt % to 0.0005 wt %, 0.0001 wt % to 0.0004 wt %, 0.0001 wt % to 0.0003 wt %, 0.0001 wt % to 0.0002 wt %, or any range derived from any two of these values.

4

Figure 3A:
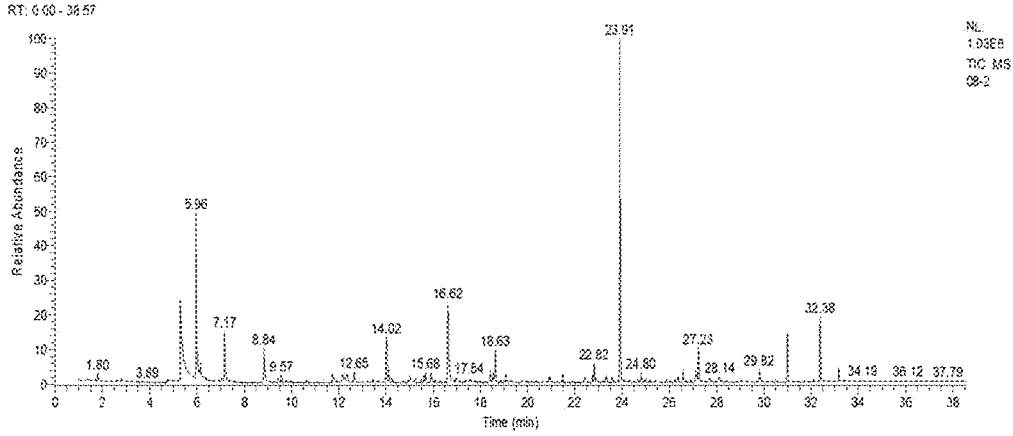
FIG. 3A is the total ions chromatography of aroma compounds in sample 18 in Example 07.
Figure 4A:
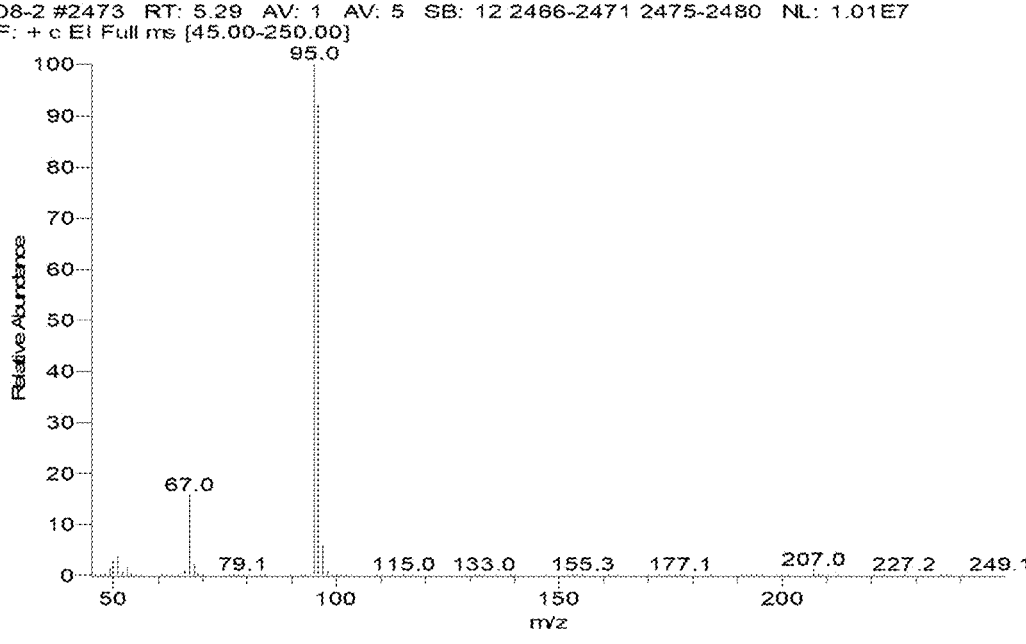
FIG. 4A is mass spectrum of compound of furfural in the total ions chromatography as shown in FIG. 3A.
Figure 4B:
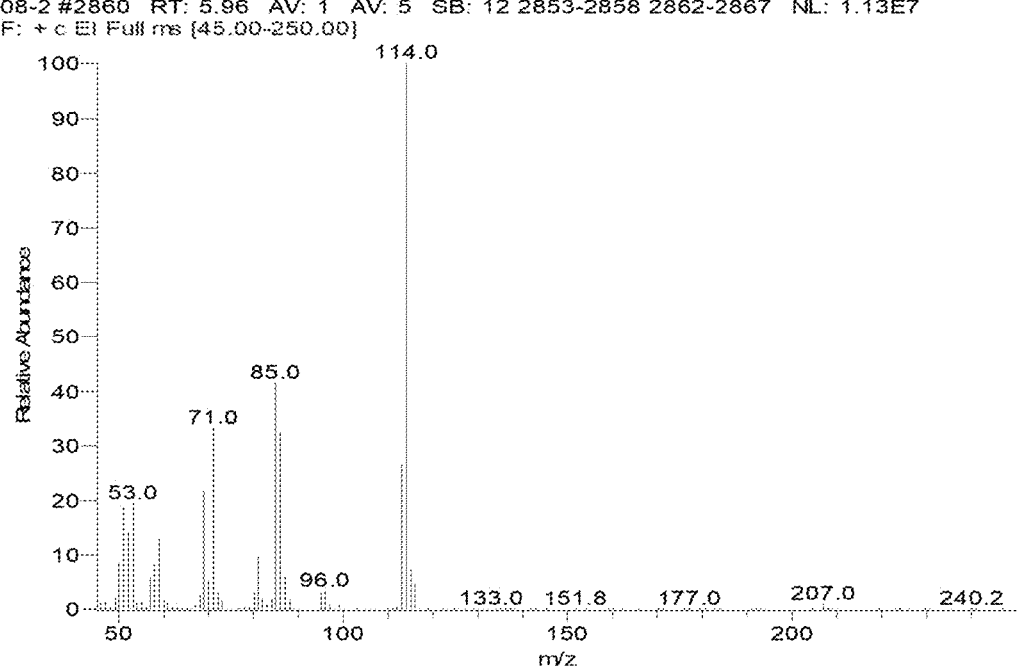
FIG. 4B is mass spectrum of compound of 2-methyl-3-furanthiol in the total ions chromatography as shown in FIG. 3A.
Figure 4C:
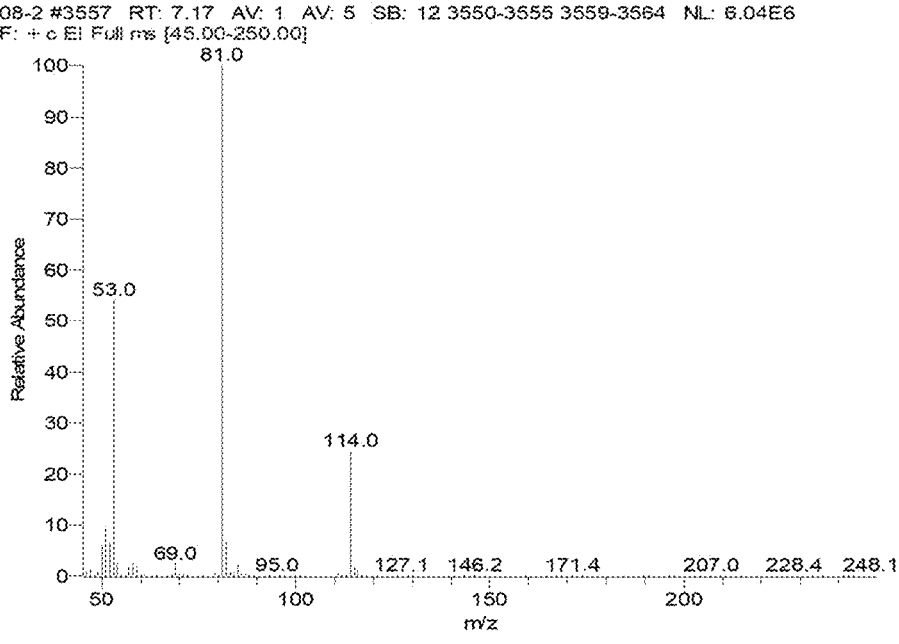
FIG. 4C is mass spectrum of compound of 2-furfurylthiol in the total ions chromatography as shown in FIG. 3A.
Figure 4D:
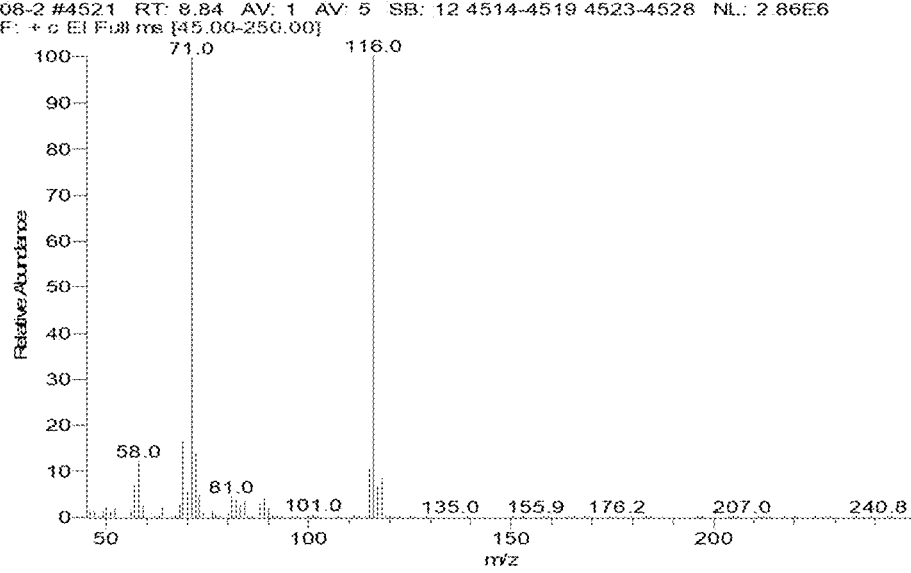
FIG. 4D is mass spectrum of compound of 2-thio-phenethiol in the total ions chromatography as shown in FIG. 3A.
Figure 4E:
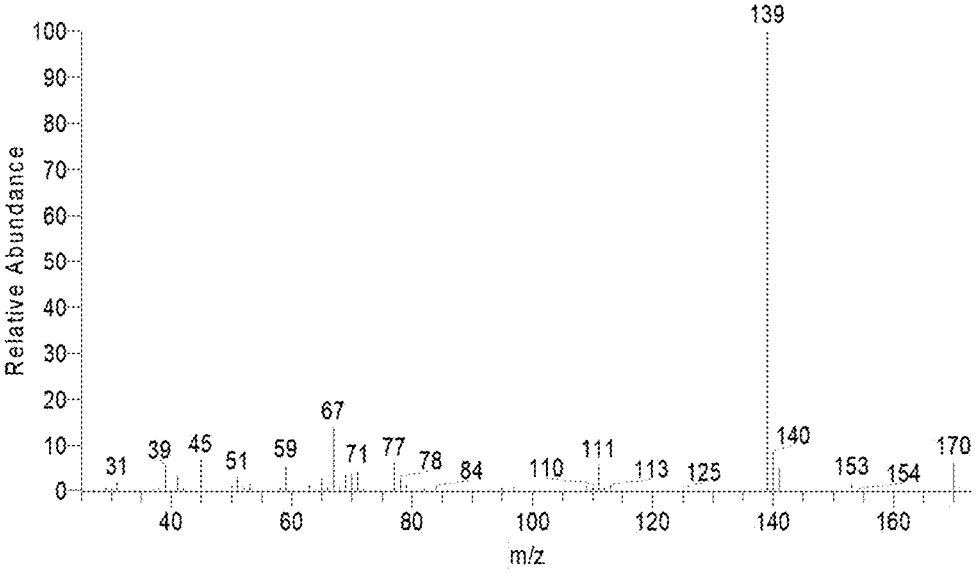
Figure 4F:
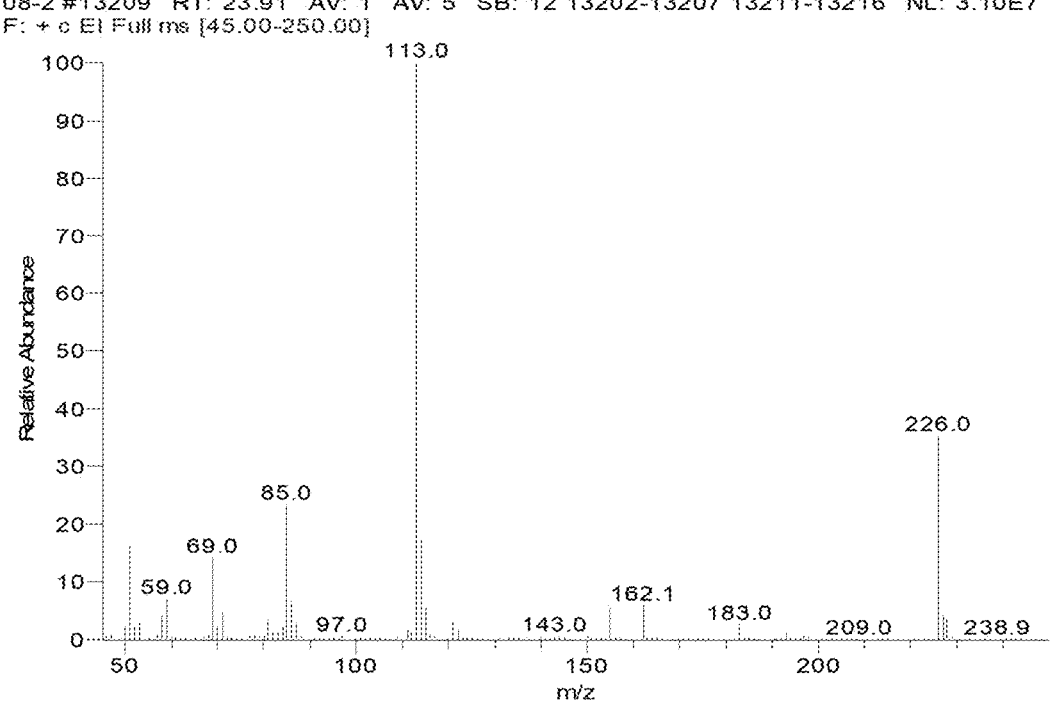
Figure 5A:
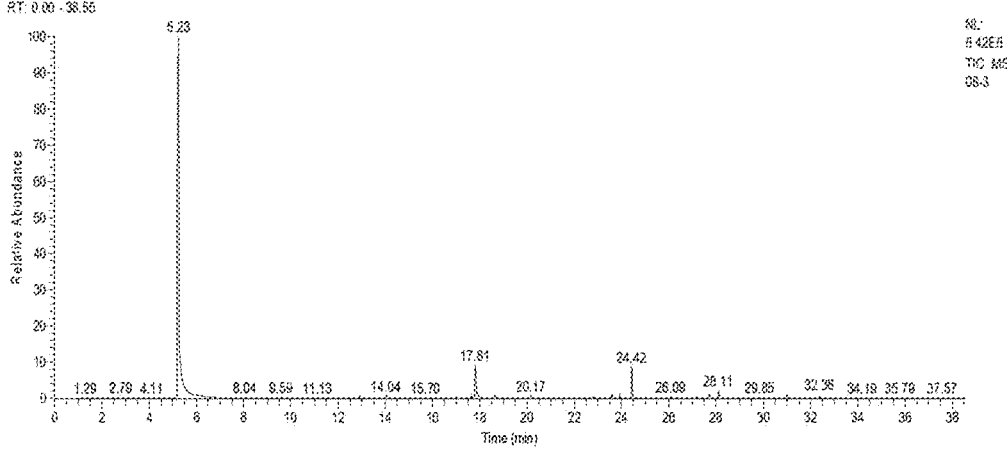
Figure 5B:
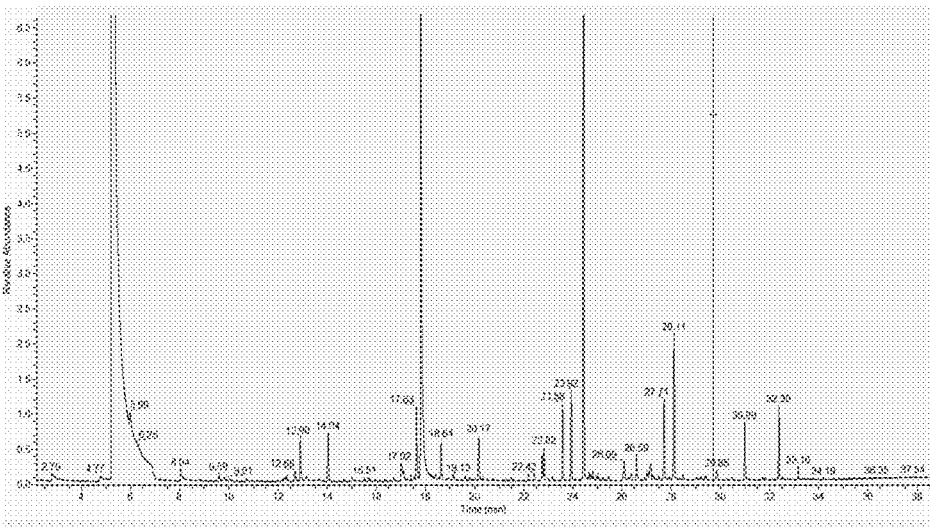
Figure 6A:
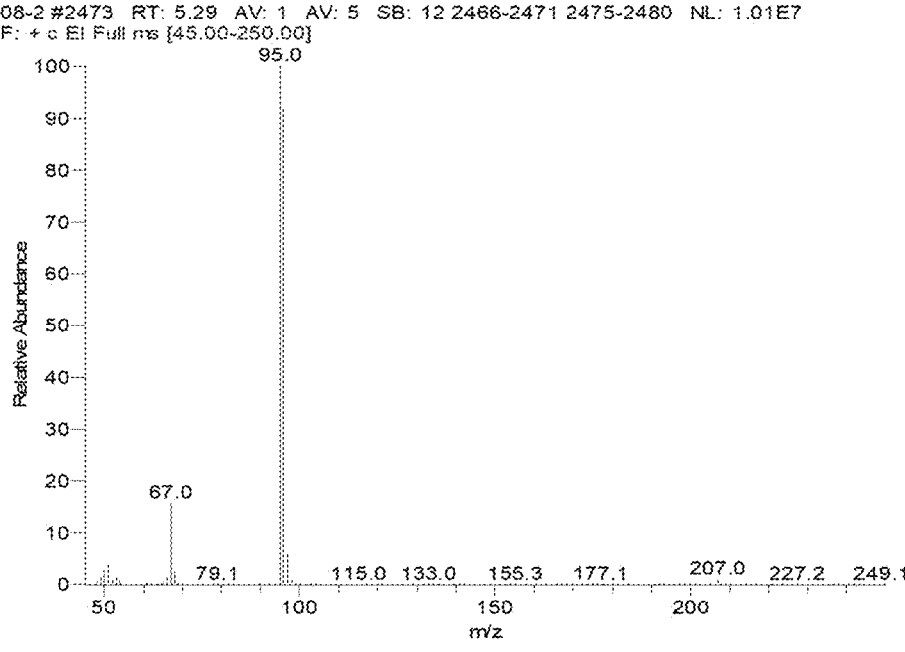
Figure 6B:
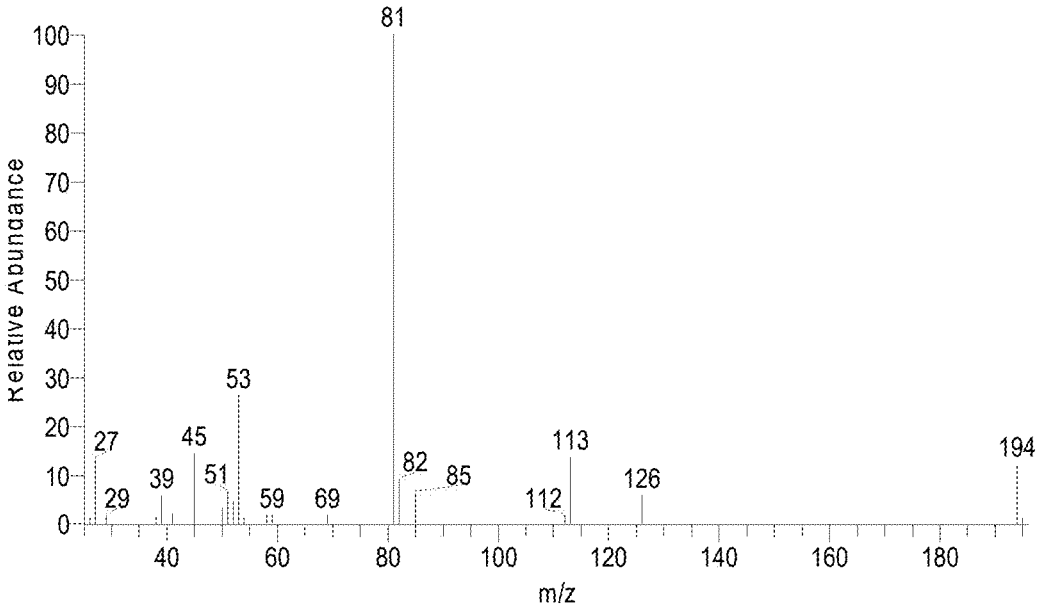
Figure 6C:
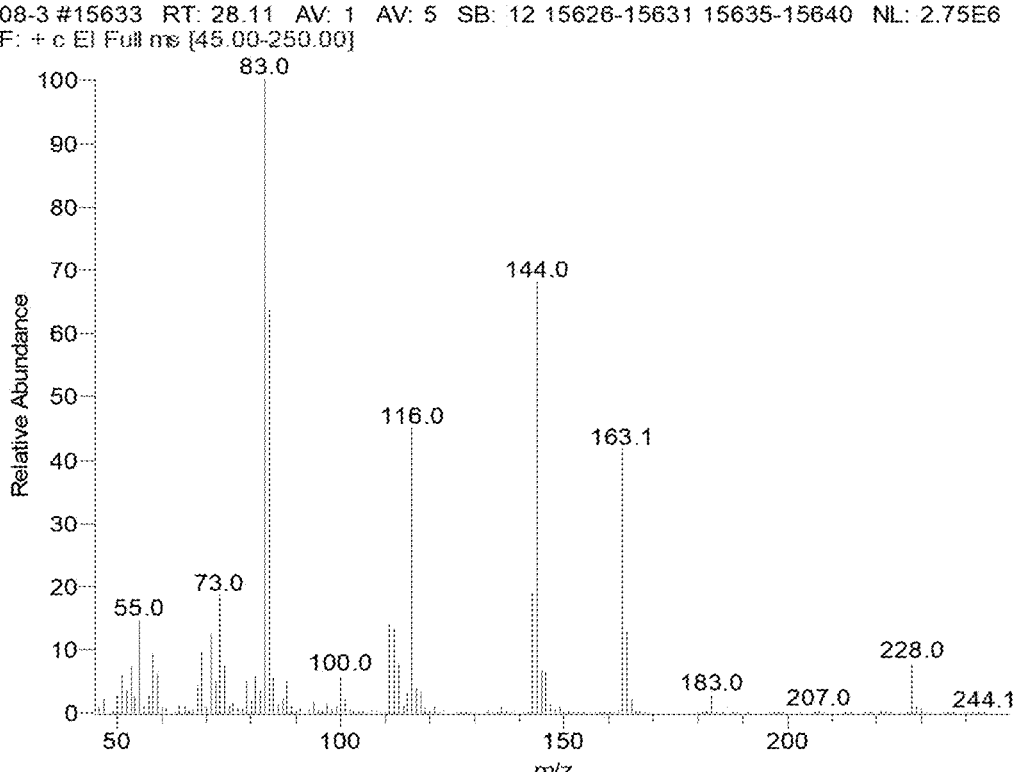

FIG. 4E is mass spectrum of compound of 2,5-thio-phenedicarboxaldehyde in the total ions chromatography as shown in FIG. 3A;

FIG. 4F is mass spectrum of compound of furan, 3,3'-dithiobis[2-methyl—in the total ions chromatography as shown in FIG. 3A;

FIG. 5A is the total ions chromatography of aroma compounds in sample 19 in Example 07;

FIG. 5B is enlarged image of 5A;

FIG. 6A is mass spectrum of compound of furfural in the total ions chromatography as shown in FIG. 5A;

FIG. 6B is mass spectrum of compound of bis(2-furfuryl) disulfide in the total ions chromatography as shown in FIG. 5A;

FIG. 6C is mass spectrum of compound of barbituric acid, 2-thio—in the total ions chromatography as shown in FIG. 5A.

DETAILED DESCRIPTION

I. Definitions

Unless defined otherwise, all technical and scientific terms used herein have the same meanings as commonly understood by one of ordinary skill in the art to which this application belongs. All publications and patents specifically mentioned herein are incorporated by reference in their entirety for all purposes including describing and disclosing the chemicals, instruments, statistical analyses, and methodologies which are reported in the publications which might be used in connection with the application. All references cited in this specification are to be taken as indicative of the level of skill in the art. Nothing herein is to be construed as an admission that the application is not entitled to antedate such disclosure by virtue of prior invention.

In the specification and in the claims, the terms "including" and "comprising" are open-ended terms and should be interpreted to mean "including, but not limited to . . . " These terms encompass the more restrictive terms "consisting essentially of" and "consisting of".

It must be noted that as used herein and in the appended claims, the singular forms "a," "an," and "the" include plural reference unless the context clearly dictates otherwise. Further, the terms "a" (or "an"), "one or more" and "at least one" can be used interchangeably herein. It is also to be noted that the terms "comprising," "including," "characterized by" and "having" can be used interchangeably. Further, any reactant concentrations described herein should be considered as being described on a weight to weight (w/w) basis, unless otherwise specified to the contrary (e.g., mole to mole, weight to volume (w/v), etc.).

As used herein, the term "Maillard reaction" refers to a non-enzymatic reaction of (1) one or more reducing and/or non-reducing sugars, and (2) one or more amine donors in the presence of heat, wherein the non-enzymatic reaction produces a Maillard reaction product and/or a flavor. Thus, this term is used unconventionally, since it accommodates the use of non-reducing sweetening agents as substrates, which were not heretofore thought to serve as substrates for the Maillard reaction.

The term "reaction mixture" refers to a composition comprising at least one amine donor and one sugar donor, wherein the reaction mixture is to be subjected to a Maillard reaction; a "reaction mixture" is not to be construed as the reaction contents after a Maillard reaction has been conducted, unless otherwise noted.

The term "sugar," as used herein, refers to a sweet-tasting, soluble carbohydrate, typically used in consumer food and beverage products.

The term "sugar donor," as used herein, refers to a sweet-tasting compound or substance from natural or synthetic sources, which can participate as a substrate in a Maillard reaction with an amine group-containing donor molecule.

The term "amine donor," as used herein, refers to a compound or substance containing a free amino group, which can participate in a Maillard reaction.

The term "Maillard reaction product" or "MRP" refers to any compound produced by a Maillard reaction between an amine donor and a sugar donor in the form of a reducing sugar, non-reducing sugar, or both. Preferably, the sugar donor includes at least one carbonyl group. In certain embodiments, the MRP comprises a compound that provides a flavor ("Maillard flavor"), a color ("Maillard color"), or both.

The generic terms "MRP composition", "Maillard product composition" and "Maillard flavor composition" are used interchangeably.

The terms "flavor" and "flavor characteristic" are used interchangeably with reference to the combined sensory perception of one or more components of taste, aroma, and/or texture.

The terms "flavoring agent", "flavoring" and "flavorant" are used interchangeably with reference to a component added to food or beverage products to impart, modify, or enhance the flavor of food. As used herein, these terms do not include substances having an exclusively sweet, sour, or salty taste (e.g., sugar, vinegar, and table salt).

The term "natural flavoring substance" refers to a flavoring substance obtained by physical processes that may result in unavoidable but unintentional changes in the chemical structure of the components of the flavoring (e.g., distillation and solvent extraction), or by enzymatic or microbiological processes, from material of plant or animal origin.

The term "synthetic flavoring substance" refers to a flavoring substance formed by chemical synthesis.

The term "enhance," as used herein, includes augmenting, intensifying, accentuating, magnifying, and potentiating the sensory perception of a flavor characteristic without changing the nature or quality thereof.

Unless otherwise specified, the terms "modify" or "modified" as used herein, includes altering, varying, suppressing, depressing, fortifying, and supplementing the sensory perception of a flavor characteristic where the quality or duration of such characteristic was deficient.

The phrase "sensory profile" or "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness." A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

As used herein, the term "off-taste" refers to an amount or degree of taste that is not characteristically or usually found in a beverage product or a consumable product of the present disclosure. For example, an off-taste is an undesirable taste of a sweetened consumable to consumers, such as, a bitter taste, a licorice-like taste, a metallic taste, an aversive taste, an astringent taste, a delayed sweetness onset, a lingering sweet aftertaste, and the like, etc.

The term "orally consumable product" refers to a composition that can be drunk, eaten, swallowed, inhaled, ingested or otherwise in contact with the mouth or nose of man or animal, including compositions which are taken into and subsequently ejected from the mouth or nose. Orally consumable products are safe for human or animal consumption when used in a generally acceptable range.

Unless otherwise noted, the term "ppm" (parts per million) means parts per million on a w/w or wt/wt basis.

II. The Maillard Reaction Products

The present application provides Maillard reaction product (MRP)-based flavoring compositions made from Maillard reaction mixtures containing sulfur element where the resulting products provide uniquely beneficial flavoring properties with wide-ranging applications to the food and beverage industry, among others.

As used herein, the Maillard reaction refers to a non-enzymatic browning reaction of a sugar donor with an amine donor in the presence of heat which produces flavor. Common flavors resulting from the Maillard reaction include, for example, those associated with red meat, poultry, coffee, vegetables, bread crust etc. subjected to heat. A Maillard reaction relies mainly on sugars and amino acids, but it can also contain other ingredients including autolyzed yeast extracts, hydrolyzed vegetable proteins, gelatin (protein source), vegetable extracts (i.e., onion powder), enzyme treated proteins, meat fats or extracts and acids or bases to adjust the pH of the reaction. The reaction can be in an aqueous environment with an adjusted pH at specific temperatures for a specified amount of time to produce a variety of flavors. Typical flavors include those associated with chicken, pork, beef, caramel, chocolate etc. However, a wide variety of different taste and aroma profiles can be achieved by adjusting the ingredients, the temperature and/or the pH of the reaction. The main advantage of the reaction flavors is that they can produce characteristic meat, burnt, roasted, caramellic, or chocolate profiles desired by the food industry, which are not typically achievable by using compounding of flavor ingredients.

Reducing groups can be found on reducing sugars (sugar donors) and amino groups can be found on amino donors such as free amino acids, peptides, and proteins. Initially, a reactive carbonyl group of a reducing sugar condenses with a free amino group, with a concomitant loss of a water molecule. A reducing sugar substrate for Maillard reaction typically has a reactive carbonyl group in the form of a free aldehyde or a free ketone. The resultant N-substituted glycoaldosylamine is not stable. The aldosylamine compound rearranges, through an Amadori rearrangement, to form a ketosamine. Ketosamines that are so-formed may further react through any of the following three pathways: (a) further dehydration to form reductones and dehydroreductones; (b) hydrolytic fission to form short chain products, such as diacetyl, acetol, pyruvaldehyde, and the like, which can, in turn, undergo Strecker degradation with additional amino groups to form aldehydes, and condensation, to form aldols; and (c) loss of water molecules, followed by reaction with additional amino groups and water, followed by condensation and/or polymerization into melanoids. Factors that affect the rate and/or extent of Maillard reactions include among others the temperature, water activity, and pH. The Maillard reaction is enhanced by high temperature, low moisture levels, and alkaline pH.

In the Maillard reaction, suitable carbonyl containing reactants include those that comprise a reactive aldehyde (—CHO) or keto (—CO—) group, such that the carbonyl free aldehyde or free keto group is available to react with an amino group associated with the reactant. Typically, the reducing reactant is a reducing sugar, e.g., a sugar that can reduce a test reagent, e.g., can reduce Cu2+ to Cu+, or can be oxidized by such reagents.

Monosaccharides, disaccharides, oligosaccharides, polysaccharides (e.g., dextrins, starches, and edible gums) and their hydrolysis products are suitable reducing reactants if they have at least one reducing group that can participate in a Maillard reaction. Reducing sugars include aldoses or ketoses such as glucose, fructose, maltose, lactose, glyceraldehyde, dihydroxyacetone, arabinose, xylose, ribose, mannose, erythrose, threose, and galactose. Other reducing reactants include uronic acids (e.g., glucuronic acid, glucuronolactone, and galacturonic acid, mannuronic acid, iduronic acid) or Maillard reaction intermediates bearing at least one carbonyl group such as aldehydes, ketones, alpha-hydroxycarbonyl or dicarbonyl compounds.

A. Maillard Reaction Components

Amine Donor

The MRP compositions of the present application are formed from a reaction mixture comprising at least one exogenous amine donor comprising a free amino group. As used herein, the term "amine donor" refers to a compound or substance containing a free amino group, which can participate in a Maillard reaction. Amine containing reactants include amino acids, peptides (including dipeptides, tripeptides, and oligopeptides), proteins, proteolytic or nonenzymatic digests thereof, and other compounds that react with reducing sugars and similar compounds in a Maillard reaction, such as phospholipids, chitosan, lipids, etc. In some embodiments, the amine donor also provides one or more sulfur-containing groups. Exemplary amine donors include amino acids, peptides, proteins, protein extracts.

Exemplary amino acids include, for example, nonpolar amino acids, such as alanine, glycine, isoleucine, leucine, methionine, tryptophan, phenylalanine, proline, valine; polar amino acids, such as cysteine, serine, threonine, tyrosine, asparagine, and glutamine; polar basic (positively charged) amino acids, such as histidine and lysine; and polar acidic (negatively charged) amino acids, such as aspartate and glutamate.

Exemplary peptides include, for example, hydrolyzed vegetable proteins (HVPs) and mixtures thereof.

Exemplary proteins include, for example, sweet taste-modifying proteins, soy protein, sodium caseinate, whey protein, wheat gluten or mixtures thereof. Exemplary sweet taste-modifying proteins include, for example, thaumatin, monellin, brazzein, miraculin, curculin, pentadin, mabinlin, and mixtures thereof. In certain embodiments, the sweet-taste modifying proteins may be used interchangeably with the term "sweetener enhancer."

Exemplary protein extracts include yeast extracts, plant extracts, bacterial extracts, and the like.

The nature of the amino donor can play an important role in accounting for the many flavors produced from a Maillard reaction. In some embodiments, the amine donor may account for one or more flavors produced from a Maillard reaction. In some embodiments, a flavor may be produced from a Maillard reaction by using one or more amine donors, or a particular combination of an amine donor and sugar donor.

In certain embodiments, the amine donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent. In some embodiments, the amine donor is from a plant source, such as vegetable juice, fruit juice, berry juice, etc.

Sugar Donor

In some embodiments, the sugar donor is a reducing sugar. Reducing sugars for use in the present application include, for example, all monosaccharides and some disaccharides, which can be aldose reducing sugars or ketose reducing sugars. Typically, the reducing sugar may be selected from the group consisting of aldotetrose, aldopentose, aldohexose, ketotetrose, ketopentose, and ketohexose reducing sugars. Suitable examples of aldose reducing sugars include erythrose, threose, ribose, arabinose, xylose, lyxose, allose, altrose, glucose, mannose, gulose, idose, galactose and talose. Suitable examples of ketose reducing sugars include erythrulose, ribulose, xylulose, psicose, fructose, sorbose, and tagatose. The aldose or the ketose may also be a deoxy-reducing sugar, for example a 6-deoxy reducing sugar, such as fucose or rhamnose.

Specific monosaccharide aldoses include, for example, reducing agents include, for example, where at least one reducing sugar is a monosaccharide, or the one or more reducing sugars are selected from a group comprising monosaccharide reducing sugars, typically at least one monosaccharide reducing sugar is an aldose or a ketose.

Where the reducing sugar is a monosaccharide, the monosaccharide may be in the D- or L-configuration, or a mixture thereof. Typically, the monosaccharide is present in the configuration in which it most commonly occurs in nature. For example, the one or more reducing sugars may be selected from the group consisting of D-ribose, L-arabinose, D-xylose, D-lyxose, D-glucose, D-mannose, D-galactose, D-psicose, D-fructose, L-fucose and L-rhamnose. In a more particular embodiment, the one or more reducing sugars are selected from the group consisting of D-xylose, D-glucose, D-mannose, D-galactose, L-rhamnose and lactose.

Specific reducing sugars include ribose, glucose, fructose, maltose, lyxose, galactose, mannose, arabinose, xylose, rhamnose, rutinose, lactose, maltose, cellobiose, glucuronolactone, glucuronic acid, D-allose, D-psicose, xylitol, allulose, melezitose, D-tagatose, D-altrose, D-alditol, L-gulose, L-sorbose, D-talitol, inulin, stachyose, including mixtures and derivatives therefrom.

Exemplary disaccharide reducing sugars for use in the present application include maltose, lactose, lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose or xylobiose.

Mannose and glucuronolactone or glucuronic acid can be used as sugar donors under Maillard reaction conditions, although they have seldom been used. Maillard reaction products of mannose, glucuronolactone or glucuronic acid provide yet another unique approach to provide new taste profiles with the sweetening agents described throughout the specification alone or in combination with additional natural sweeteners, synthetic sweeteners, and/or flavoring agents described herein.

In some embodiments, one or more carbohydrate sweeteners may be added to a reaction mixture subjected to the Maillard reaction. In other embodiments, one or more carbohydrate sweeteners may be added to an MRP composition. Non-limiting examples of carbohydrate sweeteners for use in the present application include caloric sweeteners, such as, sucrose, fructose, glucose, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, sugar alcohols, such as erythritol, xylitol, mannitol, sorbitol, maltitol, lactitol, mannitol, and inositol; xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (containing fructose and glucose, e.g., HFCS55, HFCS42, or HFCS90), coupling sugars, soybean oligosaccharides, and glucose syrup. Additionally, the above carbohydrates may be in either the D- or L-configuration.

It should be noted, however, that not all carbohydrate sweeteners are reducing sugars. Sugars having acetal or ketal linkages are not reducing sugars, as they do not have free aldehyde chains. They therefore do not react with reducing-sugar test solutions (e.g., in a Tollens' test or Benedict's test). However, a non-reducing sugar can be hydrolyzed using diluted hydrochloric acid.

In some embodiments, the sugar donor is a non-reducing sugar that does not contain free aldehyde or free keto groups. Exemplary non-reducing sugars include, but are not limited to, sucrose, trehalose, xylitol, and raffinose. In some embodiments, the sugar donor comprises both reducing sugar and non-reducing sugar. In some embodiments, the sugar donor is derived from a food ingredient, such as sugar, flour, starch, vegetable, and fruits. In some embodiments, the sugar donor is from a plant source, such as fruit juice, berry juice, vegetable juice, etc. In some embodiments, the sugar donor is orange juice, cranberry juice, apple juice, peach juice, watermelon juice, pineapple juice, grape juice, and concentrated product thereof. In some embodiments, the fruit juice, berry juice or vegetable juice serves as both amine donor and sugar donor.

In some embodiments, the sugar donor and amino donor are present in the reaction mixture in a molar ratio of 10:1 to 1:10, 8:1 to 1:8, 6:1 to 1:6, 4:1 to 1:4, 3:1 to 1:3 or 2:1 to 1:2. In some embodiments, the sugar donor and amino donor are present in the reaction mixture in a molar ratio of 10:1, 9:1, 8:1, 7:1, 6:1, 5:1, 4:1, 3:1, 2:1, 1:1, 1:2, 1:3, 1:4, 1:5, 1:6, 1:7, 1;8, 1:9, 1:10, or any range derived from any two of these values.

In one embodiment, the Maillard mixture includes two different components in weight ratios of 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51 and 50:50, and all ranges therebetween, where the ratios are from 1:99 and vice versa, e.g., a ratio of from 1:99 to 50:50, from 30:70 to 42:58, or any range derived from any two of these specific values etc.

In another embodiment, the Maillard reaction mixture includes three different components in weight ratios of 1:1:98, 1:2:97, 1:3:96, 1:4:95, 1:5:94, 1:6:93, 1:7:92, 1:8:91, 1:9:90, 1:10:89, 1:11:88, 1:12:87, 1:13:86, 1:14:85, 1:15:84, 1:16:83, 1:17:82, 1:18:81, 1:19:80, 1:20:79, 1:21:78, 1:22:77, 1:23:76, 1:24:75, 1:25:74, 1:26:73, 1:27:72, 1:28:71, 1:29:70, 1:30:69, 1:31:68, 1:32:67, 2:3:95, 2:4:94, 2:5:93, 2:6:92, 2:7:91, 2:8:90, 2:9:89, 2:10:88, 2:11:87, 2:12:86, 2:13:85, 2:14:84, 2:15:83, 2:16:82, 2:17:81, 2:18:80, 2:19:79, 2:20:78, 2:21:77, 2:22:76, 2:23:75, 2:24:74, 2:25:73, 2:26:72, 2:27:71, 2:28:70, 2:29:69, 2:30:68, 2:31:67, 2:32:66, 2:3:95, 3:3:94, 3:4:93, 3:5:92, 3:6:91, 3:7:90, 3:8:89, 3:9:88, 3:10:87, 3:11:86, 3:12:85, 3:13:84, 3:14:83, 3:15:82, 3:16:81, 2:17:80, 3:18:79, 3:19:78, 3:20:77, 3:21:76, 3:22:75, 3:23:74, 3:24:73, 3:25:72, 3:26:71, 3:27:70, 3:28:69, 3:29:68, 3:30:67, 3:31:66, 3:32:65, 4:4:92, 4:5:91, 4:6:90, 4:7:89, 4:8:88, 4:9:87, 4:10:86, 4:11:85, 4:12:84, 4:13:83, 4:14:82, 4:15:81, 4:16:80, 4:17:79, 4:18:78, 4:19:77, 4:20:76, 4:21:75, 4:22:74, 4:23:73, 4:24:72, 4:25:71, 4:26:70, 4:27:69, 4:28:68, 4:29:67, 4:30:66, 4:31:65, 4:32:64, 5:5:90, 5:6:89, 5:7:88, 5:8:87, 5:9:86, 5:10:85, 5:11:84, 5:12:83, 5:13:82, 5:14:81, 5:15:80, 5:16:79, 5:17:78, 5:18:77, 5:19:76, 5:20:75, 5:21:74, 5:22:73, 5:23:72, 5:24:71, 5:25:70, 5:26:69, 5:27:68, 5:28:67, 5:29:66, 5:30:65, 5:31:64, 5:32:63, 6:6:88, 6:7:87, 6:8:86, 6:9:85, 6:10:84, 6:11:83, 6:12:82, 6:13:81, 6:14:80, 6:15:79, 6:16:78, 6:17:77, 6:18:76, 6:19:75, 6:20:74, 6:21:73, 6:22:72, 6:23:71, 6:24:70, 6:25:69, 6:26:68, 6:27:67, 6:28:66, 6:29:65, 6:30:64, 6:31:63, 6:32:62, 7:7:86, 7:8:85, 7:9:84, 7:10:83, 7:11:82, 7:12:81, 7:13:80, 7:14:79, 7:15:78, 7:16:77, 7:17:76, 7:18:75, 7:19:74, 7:20:73, 7:21:72, 7:22:71, 7:23:70, 7:24:69, 7:25:68, 7:26:67, 7:27:66, 7:28:65, 7:29:64, 7:30:63, 7:31:62, 7:32:61, 8:8:84, 8:9:83, 8:10:82, 8:11:81, 8:12:80, 8:13:79, 8:14:78, 8:15:77, 8:16:76, 8:17:75, 8:18:74, 8:19:73, 8:20:72, 8:21:71, 8:22:70, 8:23:69, 8:24:68, 8:25:67, 8:26:66, 8:27:65, 8:28:64, 8:29:63, 8:30:62, 8:31:61, 8:32:60, 9:9:82, 9:10:81, 9:11:80, 9:12:79, 9:13:78, 9:14:77, 9:15:76, 9:16:75, 9:17:74, 9:18:73, 9:19:72, 9:20:71, 9:21:70, 9:22:69, 9:23:68, 9:24:67, 9:25:66, 9:26:65, 9:27:64, 9:28:63, 9:29:62, 9:30:61, 9:31:60, 9:32:59, 10:10:80, 10:11:79, 10:12:78, 10:13:77, 10:14:76, 10:15:75, 10:16:74, 10:17:73, 10:18:72, 10:19:71, 10:20:70, 10:21:69, 10:22:68, 10:23:67, 10:24:66, 10:25:65, 10:26:64, 10:27:63, 10:28:62, 10:29:61, 10:30:60, 10:31:59, 10:32:58, 11:11:78, 11:12:77, 11:13:76, 11:14:75, 11:15:74, 11:16:73, 11:17:72, 11:18:71, 11:19:70, 11:20:69, 11:21:68, 11:22:67, 11:23:66, 11:24:65, 11:25:64, 11:26:63, 11:27:62, 11:28:61, 11:29:60, 11:30:59, 11:31:58, 11:32:57, 12:12:76, 12:13:75, 12:14:74, 12:15:73, 12:16:72, 12:17:71, 12:18:70, 12:19:69, 12:20:68, 12:21:67, 12:22:66, 12:23:65, 12:24:64, 12:25:63, 12:26:62, 12:27:61, 12:28:60, 12:29:59, 12:30:58, 12:31:57, 12:32:56, 13:13:74, 13:14:73, 13:15:72, 13:16:71, 13:17:70, 13:18:69, 13:19:68, 13:20:67, 13:21:66, 13:22:65, 13:23:64, 13:24:63, 13:25:62, 13:26:61, 13:27:60, 13:28:59, 13:29:58, 13:30:57, 13:31:56, 13:32:55, 14:14:72, 14:15:71, 14:16:70, 14:17:69, 14:18:68, 14:19:67, 14:20:66, 14:21:65, 14:22:64, 14:23:63, 14:24:62, 14:25:61, 14:26:60, 14:27:59, 14:28:58, 14:29:57, 14:30:56, 14:31:55, 14:32:54, 15:15:70, 15:16:69, 15:17:68, 15:18:67, 15:19:66, 15:20:65, 15:21:64, 15:22:63, 15:23:62, 15:24:61, 15:25:60, 15:26:59, 15:27:58, 17:28:57, 15:29:56, 15:30:55, 15:31:54, 15:32:53, 16:16:68, 16:17:67, 16:18:66, 16:19:65, 16:20:64, 16:21:63, 16:22:62, 16:23:61, 16:24:60, 16:25:59, 16:26:58, 16:27:57, 16:28:56, 16:29:55, 16:30:54, 16:31:53, 16:32:52, 17:17:66, 17:18:65, 17:19:64, 17:20:63, 17:21:62, 17:22:61, 17:23:60, 17:24:59, 17:25:58, 17:26:57, 17:27:56, 17:28:55, 17:29:54, 17:30:53, 17:31:52, 17:32:51, 18:18:64, 18:19:63, 18:20:62, 18:21:61, 18:22:60, 18:23:59, 18:24:58, 18:25:57, 18:26:56, 18:27:55, 18:28:54, 18:29:53, 18:30:52, 18:31:51, 18:32:50, 19:19:62, 19:20:61, 19:21:60, 19:22:59, 19:23:58, 19:24:57, 19:25:56, 19:26:55, 19:27:54, 19:28:53, 19:29:52, 19:30:51, 19:31:50, 19:32:49, 20:20:60, 20:21:59, 20:22:58, 20:23:57, 20:24:56, 20:25:55, 20:26:54, 20:27:53, 20:28:52, 20:29:51, 20:30:50, 20:31:49, 20:32:48, 21:21:58, 21:22:57, 21:23:56, 21:24:55, 21:25:54, 21:26:53, 21:27:52, 21:28:51, 21:29:50, 21:30:49, 21:31:48, 21:32:47, 22:22:56, 22:23:55, 22:24:54, 22:25:53, 22:26:52, 22:27:51, 22:28:50, 22:29:49, 22:30:48, 22:31:47, 22:32:46, 23:23:54, 23:24:53, 23:25:52, 23:26:51, 23:27:50, 23:28:49, 23:29:48, 23:30:47, 23:31:46, 23:32:45, 24:24:52, 24:25:51, 24:26:50, 24:27:49, 24:28:48, 24:29:47, 24:30:46, 24:31:45, 24:32:44, 25:25:50, 25:26:49, 25:27:48, 25:28:47, 25:29:46, 25:30:45, 25:31:44, 25:32:43, 26:26:48, 26:27:47, 26:28:46, 26:29:45, 26:30:44, 26:31:43, 26:32:42, 27:27:46, 27:28:45, 27:29:44, 27:30:43, 27:31:42, 27:32:41, 28:28:44, 28:29:43, 28:30:42, 28:31:41, 28:32:40, 29:29:42, 29:30:41, 29:31:40, 29:32:39, 30:30:40, 30:31:39, 30:32:38, 31:31:38, 31:32:37, 32:32:36, 32:33:35, and 33.3:33.3:33.3, and all ranges therebetween, where the ratios are from 1:1:98 and vice versa, e.g., a ratio of from 1:1:98 to 33.3:33.3:33.3, from 10:30:70 to 15:40:45, etc.

It is noted that the present disclosure is not limited to compositions having only two or three different components, and that the exemplary ratios are non-limiting. Rather, the same formula can be followed for establishing ratios of as many different components as are contained within a given composition. As a further example, in a composition that comprises 20 different components described herein, the components can have ratios of from 1:1:1:1:1:1:1:1:1:1: 1:1:1:1:1:1:1:1:81 to 5:5:5:5:5:5:5:5:5:5:5:5:5:5:5:5:5:5:5:5, and all possible combinations of ratios therebetween. In some embodiments, a composition of the present disclosure may have up to and including a combination of all compounds.

In some embodiments, the one or more MRPs are formed from a Maillard reaction mixture containing a sugar donor content of 1-99 wt %, 1-95 wt %, 1-90 wt %, 1-80 wt %, 1-70 wt %, 1-60 wt %, 1-50 wt %, 1-40 wt %, 1-30 wt %, 1-20 wt %, 1-10 wt %, 1-5 wt %, 5-99 wt %, 5-95 wt %, 5-90 wt %, 5-80 wt %, 5-70 wt %, 5-60 wt %, 5-50 wt %, 5-40 wt %, 5-30 wt %, 5-20 wt %, 5-10 wt %, 10-99 wt %, 10-95 wt %, 10-90 wt %, 10-80 wt %, 10-70 wt %, 10-60 wt %, 10-50 wt %, 10-40 wt %, 10-30 wt %, 10-20 wt %, 20-99 wt %, 20-95 wt %, 20-90 wt %, 20-80 wt %, 20-70 wt %, 20-60 wt %, 20-50 wt %, 20-40 wt %, 20-30 wt %, 30-99 wt %, 30-95 wt %, 30-90 wt %, 30-80 wt %, 30-70 wt %, 30-60 wt %, 30-50 wt %, 30-40 wt %, 40-99 wt %, 40-95 wt %, 40-90 wt %, 40-80 wt %, 40-70 wt %, 40-60 wt %, 40-50 wt %, 50-99 wt %, 50-95 wt %, 50-90 wt %, 50-80 wt %, 50-70 wt %, 50-60 wt %, 60-99 wt %, 60-95 wt %, 60-90 wt %, 60-80 wt %, 60-70 wt %, 70-99 wt %, 70-95 wt %, 70-90 wt %, 70-80 wt %, 80-99 wt %, 80-95 wt %, 80-90 wt %, 90-99 wt %, 90-95 wt %, or 95-99 wt %, or any range derived from any two of these values.

In some embodiments, the one or more MRPs are formed from a Maillard reaction mixture containing a sufur-contained amine donor content of 1-99 wt %, or 1-98 wt %, or at least 1 wt %, at least 2 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 99 wt %; or any range defined by any pair of these integers.

The Maillard reaction is conducted with a suitable solvent. Additionally, solvents can be employed along with water. Suitable solvents approved for oral use include, for example, alcohols, such as low molecular weight alcohols, e.g., methanol, ethanol, propanol, butanol, pentanol, hexanol, ethylene glycol, propylene glycol, butyl glycol, etc. The following additional solvents may be used in the Maillard reaction or may act as carriers for Maillard reaction products: acetone, benzyl alcohol, 1,3-butylene glycol, carbon dioxide, castor oil, citric acid esters of mono- and di-glycerides, ethyl acetate, ethyl alcohol, with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

Although recognizing that other suitable solvents may be used for flavoring agents, The International Organization of the Flavor Industry (IOFI) Code of Practice (Version 1.3, dated Feb. 29, 2012) lists the following solvents as being appropriate for use in flavoring agents: acetic acid, benzyl alcohol, edible oils, ethyl alcohol, glycerol, hydrogenated vegetable oils, isopropyl alcohol, mannitol, propylene glycol, sorbitol, sorbitol syrup, water, and xylitol. Accordingly, in certain embodiments, these are preferred solvents.

In some embodiments, the solvent is water. In some embodiments, the solvent is glycerol. In some embodiments, the solvent is a glycerol-water mixture with a glycerol:water ratio (v:v) of 10:1 to 1:10, 9:1 to 1:9, 8:1 to 1:8, 7:1 to 1:7, 6:1 to 1:6, 1:5 to 5:1, 1:4 to 4:1, 1:3 to 3:1, 1:2 to 2:1. In some embodiments, the solvent is a glycerol-water mixture with a glycerol:water ratio (v:v) of 1:9, 1:8, 1:7, 1:6, 1:5, 1:4, 1:3, 1:2, 1:1, 2:1, 3:1, 4:1, 5:1, 6:1, 7:1, 8:1 or 9:1.

In some embodiments, the reaction mixture comprises a solvent in an amount of 10-90 wt %, 10-80 wt %, 10-70 wt %, 10-60 wt %, 10-50 wt %, 10-40 wt %, 10-30 wt %, 10-20 wt %, 20-90 wt %, 20-80 wt %, 20-70 wt %, 20-60 wt %, 20-50 wt %, 20-40 wt %, 20-30 wt %, 30-90 wt %, 30-80 wt %, 30-70 wt %, 30-60 wt %, 30-50 wt %, 30-40 wt %, 40-90 wt %, 40-80 wt %, 40-70 wt %, 40-60 wt %, 40-50 wt %, 50-90 wt %, 50-80 wt %, 50-70 wt %, 50-60 wt %, 60-90 wt %, 60-80 wt %, 60-70 wt %, 70-90 wt %, 70-80 wt %, or 80-90 wt % of the reaction mixture. In some embodiments, the reaction mixture comprises a solvent in an amount of about 10 wt %, about 15 wt %, about 20 wt %, about 25 wt %, about 30 wt %, about 33 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, or any range derived from any two of these values, of the reaction mixture.

In one embodiment, a Maillard reaction mixture or an MRP composition produced thereof may include a sweetener, and optionally one or more MRP products, wherein the sweetener is selected from date paste, apple juice concentrate, monk fruit concentrate, sugar beet syrup, pear juice or puree concentrate, apricot juice concentrate. Alternatively, a root or berry juice may be used as sugar donor or sweetener added to an MRP composition.

In some embodiments, particular flavors may be produced from a Maillard reaction using one or more sugar donors, where at least one sugar donor is selected from plant juice/powder, vegetable juice/powder, berries juice/powder, fruit juice/powder. In certain preferred embodiments, a concentrate or extract may be used, such as a bilberry juice concentrate or extract having an abundance of anthocyanins. Optionally, at least one sugar donor and/or one amine donor is selected from animal source-based products, such as meat, oil etc. Meat from any part of an animal, or protein(s) from any part of a plant could be used as source of amino donor(s) in this application.

In some embodiments, the Maillard reactants may further include one or more high intensity synthetic sweeteners, non-mogroside natural sweeteners, and/or the glycosylation products thereof. Alternatively, or in addition, the high intensity synthetic sweeteners may be added to an MRP composition comprising reaction products formed in the Maillard reaction.

High intensity synthetic sweeteners are synthetically produced sugar substitutes or sugar alternatives that are similarly many times sweeter than sugar and contribute few to no calories when added to foods. Moreover, they can be similarly used as Maillard reaction components or as flavor enhancers added to MRP compositions of the present application. High intensity synthetic sweeteners include Advantame, Aspartame, Acesulfame potassium (Ace-K), Neotame, Sucralose, and Saccharin.

The inventor has found that the content of the solid materials in the starting mixture of a Maillard reaction has an impact on the outcome of the Maillard reaction. In some embodiments, the MRP of the present application is prepared from a reaction mixture with a dry substance content of 20 wt %-99%, or about 20 wt %, 30 wt %, 40 wt %, 50 wt %, 60 wt %, 65 wt %, 70 wt %, 75 wt %, 80 wt %, 85 wt %, 90 wt % or 95 wt %, or any range derived from any two of these values. In some embodiments, the MRP of the present application is prepared from a reaction mixture with a dry substance content greater than 60 wt %, 65 wt %, 70 wt %, 75 wt %, 80 wt %, 85 wt %, 90 wt % or 95 wt %.

B. Use of Raw Materials in MRP Reactions

In some embodiments, the reactants for the Maillard reaction include several different raw materials for producing MRP compositions. The raw materials may be categorized into the following groups comprising the following exemplary materials:

1) Protein Nitrogen Sources:

Protein nitrogen containing foods (meat, poultry, eggs, dairy products, cereals, vegetable products, fruits, yeasts), extracts thereof and hydrolysis products thereof, autolyzed yeasts, peptides, amino acids and/or their salts.

2) Carbohydrate Sources:

Foods containing carbohydrates (cereals, vegetable products and fruits) and their extracts; mono-, di- and polysaccharides (sugars, dextrins, starches and edible gums), and hydrolysis products thereof.

3) Fat or Fatty Acid Sources:

Foods containing fats and oils, edible fats, and oil from animal, marine or vegetable origin, hydrogenated, transesterified and/or fractionated fats and oils, and hydrolysis products thereof.

4) Miscellaneous List of Additional Ingredients:

Foodstuffs, herbs, spices, their extracts, and flavoring agents identified therein Water Thiamine and its hydrochloric salt Ascorbic, Citric, Lactic, Fumaric, Malic, Succinic, Tartaric and the Na, K, Ca, Mg and NH4 salts of these acids Guanylic acid and inosinic acid and its Na, K and Ca salts Inositol Sodium, potassium and ammonium sulphides, hydrosulphides, and polysulphides Lecithin Acids, bases, and salts as pH regulators:

Acetic, hydrochloric, phosphoric, and sulphuric acids

Sodium, potassium, calcium, and ammonium hydroxide.

Salts of the above acids and bases

Polymethylsiloxane as antifoaming agent.

In another aspect, the present application contemplates the use of any one of several raw materials exemplified below to produce MRP compositions:

Sugar Syrups: Xylose syrup, arabinose syrup and rhamnose syrup manufactured from beech wood. Ardilla Technologies supply these along with natural crystalline L-xylose, L-arabinose and L-rhamnose. Xylose syrup may also be obtained from natural sources, such as the xylan-rich portion of hemicellulose, mannose syrup from ivory nut, etc. These and other types of syrup described herein can be used as sugar donors in the compositions described herein.

Hydrolyzed gum arabic: Thickeners, such as gum arabic can be hydrolyzed with an organic acid or by enzyme hydrolysis to produce a mixture containing arabinose. Arabinose could also be obtained from other wood-based or biomass hydrolysate. Cellulose enzymes can also be used.

Meat Extracts: Commercially available from several companies, such as Henningsens (Chicken skin and meat), which gives excellent chicken notes.

Jardox: Meat and poultry extracts and stocks.

Kanegrade: Fish powders, anchovy, squid, tuna, and others.

Vegetable Powders: onion and garlic powders, celery, tomato, and leek powders are effective flavor contributors to reaction flavors.

Egg Yolk: Contains 50% fat and 50% protein. The fat contains phospholipids and lecithin. The proteins are coagulating proteins and their activity must be destroyed by hydrolysis with acid or using proteases prior to use. This will also liberate amino acids and peptides useful in reaction flavors (Allergen activity).

Vegetable oils: Peanut (groundnut) oil-Oleic acid 50%, Linoleic acid 32%—beef and lamb profile. Sunflower—linoleic acid 50-75%, oleic 25%—chicken profile. Canola (rapeseed)—oleic 60%, linoleic 20%, alpha-linoleic 10%, gadoleic 12%.

Sauces: Fish sauce, soy sauce, oyster sauce, miso.

Enzyme Digests: Beef heart digest—rich in phospholipids. Liver digest—at low levels<5% gives a rich meaty character. Meat digests can also add authenticity, but they are usually not as powerful as yeast extracts and HVPs.

Enzyme enhanced umami products—shitake or porcini mushrooms, kombu, etc. Enzyme digested fats—beef, lamb, etc.

All the components of the compositions disclosed herein can be purchased or made by processes known to those of ordinary skill in the art and combined (e.g., precipitation/co-precipitation, mixing, blending, grounding, mortar, and pestle, microemulsion, solvothermal, sonochemical, etc.) or treated as defined by the current invention.

C. Maillard Reaction Conditions

Maillard reaction conditions are affected by temperature, pressure, pH, reaction times, ratio of different reactants, types of solvents, and solvents-to-reactants ratio. Accordingly, in certain embodiments, the reaction mixture may include a pH regulator, which can be an acid or a base. Suitable base regulators include, for example, sodium hydroxide, potassium hydroxide, baking powder, baking soda any useable food grade base salts including alkaline amino acids. Additionally, the Maillard reaction can be conducted in the presence of alkalinic amino acids without the need of an additional base where the alkaline amino acid serves as the base itself. The pH of the reaction mixture can be maintained at any pH suitable for the Maillard reaction. In certain embodiments, the pH is maintained at a pH of from about 2 to about 14, from about 2 to about 7, from about 3 to about 9, from about 4 to about 8, from about 5 to about 7, from about 7 to about 14, from about 8 to about 10, from about 9 to about 11, from about 10 to about 12, or any pH range derived from these integer values.

In some embodiments, the reaction mixture has a pH of a range of 4-9, or 4, 4.5, 5, 5.5, 6, 6.5 7, 7.5, 8, 8.5, 9, 9.5 at the initiation of the Maillard reaction.

In any of the embodiments described in the present application, the reaction temperature in any of the Maillard reaction mixtures described in the present application may be 0-1000° C., preferably 50-200° C.; or 0° C., 5° C., 10° C., 20° C., 25° C., 30° C., 35° C., 40° C., 50° C., 55° C., 60° C., 65° C., 70° C., 80° C., 90° C., 100° C., 110° C., 120° C., 125° C., 130° C., 135° C., 140° C., 150° C., 155° C., 160° C., 165° C., 170° C., 180° C., 190° C., 200° C., 210° C., 220° C., 225° C., 230° C., 235° C., 240° C., 250° C., 255° C., 260° C., 265° C., 270° C., 280° C., 290° C., 300° C., 400° C., 500° C., 600° C., 700° C., 800° C., 900° C., 1000° C., or any temperature range defined by any two temperature values in this paragraph.

In more particular embodiments, the reaction temperature in any of the Maillard reaction mixtures described in the present application may range from 0° C. to 1000° C., 10° C. to 300° C., from 15° C. to 250° C., from 20° C. to 250° C., from 40° C. to 250° C., from 60° C. to 250° C., from 80° C. to 250° C., from 100° C. to 250° C., from 120° C. to 250° C., from 140° C. to 250° C., from 160° C. to 250° C., from 180° C. to 250° C., from 200° C. to 250° C., from 220° C. to 250° C., from 240° C. to 250° C., from 40° C. to 225° C., from 60° C. to 225° C., from 80° C. to 225° C., from 100° C. to 225° C., from 120° C. to 225° C., from 140° C. to 225° C., from 160° C. to 225° C., from 180° C. to 225° C., from 200° C. to 225° C., from 40° C. to 200° C., from 60° C. to 200° C., from 80° C. to 200° C., from 100° C. to 200° C., from 120° C. to 200° C., from 140° C. to 200° C., from 160° C. to 200° C., from 180° C. to 200° C., from 40° C. to 180° C., from 60° C. to 180° C., from 80° C. to 180° C., from 100° C. to 180° C., from 120° C. to 180° C., from 140° C. to 180° C., from 160° C. to 180° C., from 40° C. to 160° C., from 60° C. to 160° C., from 80° C. to 160° C., from 100° C. to 160° C., from 120° C. to 160° C., from 140° C. to 160° C., from 40° C. to 140° C., from 60° C. to 140° C., from 80° C. to 140° C., from 100° C. to 140° C., from 120° C. to 140° C., from 40° C. to 120° C., from 60° C. to 120° C., from 80° C. to 120° C., from 100° C. to 120° C., from 40° C. to 100° C., from 60° C. to 100° C., from 80° C. to 100° C., from 40° C. to 80° C., from 60° C. to 80° C. or from 60° C. to 80° C. or any aforementioned temperature value in this paragraph, or a temperature range defined by any pair of the aforementioned temperature values in this paragraph.

Maillard reaction(s) can be conducted either under open or sealed conditions. The reaction time is generally from 1 second to 100 hours, more particularly from 1 minute to 24 hours, from 1 minute to 12 hours, from 1 minute to 8 hours, from 1 minute to 4 hours, from 1 minute to 2 hours, from 1 minute to 1 hour, from 1 minute to 40 minutes, from 1 minute to 20 minutes, from 1 minute to 10 minutes, from 10 minutes to 24 hours, from 10 minutes to 12 hours, from 10 minutes to 8 hours, from 10 minutes to 4 hours, from 10 minutes to 2 hours, from 10 minutes to 1 hour, from 10 minutes to 40 minutes, from 10 minutes to 20 minutes, from 20 minutes to 24 hours, from 20 minutes to 12 hours, from 20 minutes to 8 hours, from 20 minutes to 4 hours, from 20 minutes to 2 hours, from 20 minutes to 1 hour, from 20 minutes to 40 minutes, from 40 minutes to 24 hours, from 40 minutes to 12 hours, from 40 minutes to 8 hours, from 40 minutes to 4 hours, from 40 minutes to 2 hours, from 40 minutes to 1 hour, from 1 hour to 24 hours, from 1 hour to 12 hours, from 1 hour to 8 hours, from 1 hour to 4 hours, from 1 hour to 2 hours, from 2 hour to 24 hours, from 2 hour to 12 hours, from 2 hour to 8 hours, from 2 hour to 4 hours, from 4 hour to 24 hours, from 4 hour to 12 hours, from 4 hour to 8 hours, from 8 hour to 24 hours, from 8 hour to 12 hours, or from 12 hour to 24 hours. Depending on the desired taste, the reaction can be terminated at any time. The Maillard reaction mixture can contain unreacted reactants, degraded substances from the reactants, pH regulator(s), and/or salt(s).

The Maillard reactions can be conducted at atmospheric pressure or under pressure. When conducted under pressure, the reaction mixture may be subjected to constant pressure, or it may be subjected to varying pressures over time. In certain embodiments, the pressure in the reaction vessel is a range of 10-800 MPa, or at least 10 MPa, at least 20 MPa, at least 30 MPa, at least 40 MPa, at least 50 MPa, at least 75 MPa, at least 100 MPa, at least 150 MPa, at least 200 MPa, at least 250 MPa, at least 300 MPa, at least 400 MPa, at least 500 MPa, at least 600 MPa, at least 700 MPa, at least 800 MPa, and any pressure range derived from the a forementioned pressure values.

In some embodiments, it is desirable to suppress the Maillard reaction, in part. This can be achieved by exercising one or more of the following approaches, including the use of raw materials that are not susceptible to browning, adjusting the factors affecting the browning velocity of Maillard reaction, lowering the temperature, lowering pH, adjusting water activity, increasing the level of oxygen, using oxidant, introducing enzymes, etc.

In certain embodiments, the use of low solubility or insoluble amino acids in the Maillard reaction may result in insoluble reactants present in the final MRP composition. In such cases, filtration may be used to remove any insoluble components present in the MRP compositions.

In some embodiments, the Maillard reaction mixtures may further include one or more carriers (or flavor carriers) acceptable for use with sweetening agents or flavoring agents. In addition, such carriers may be suitable e.g., as solvents for the Maillard reaction.

Exemplary carriers include acetylated distarch adipate, acetylated distarch phosphate, agar, alginic acid, beeswax, beta-cyclodextrin, calcium carbonate, calcium silicate, calcium sulphate, candelilla wax, carboxymethyl cellulose, sodium salt, carnauba wax, carrageenan, microcrystalline cellulose, dextran, dextrin, diammonium phosphate, distarch phosphate, edible fats, elemi resin, ethyl lactate, ethyl cellulose, ethyl hydroxyethyl cellulose, ethyl tartrate, gelatin, gellan gum, ghatti gum, glucose, glyceryl diacetate, glyceryl diesters of aliphatic fatty acids C6-C18, glyceryl monoesters of aliphatic fatty acids C6-C18, glyceryl triacetate (triacetin), glyceryl triesters of aliphatic fatty acids C6-C18, glyceryl tripropanoate, guar gum, gum arabic, hydrolyzed vegetable protein, hydroxyproplymethyl cellulose, hydroxypropyl cellulose, hydroxypropyl distarch phosphate, hydroxypropyl starch, karaya gum, konjac gum, lactic acid, lactose, locust bean gum (carob bean gum), magnesium carbonate, magnesium salts of fatty acids, maltodextrin, methyl cellulose, medium chain triglyceride, modified starches, such as acetylated distarch adipate, acetylated oxidized starch, acid-treated starch, alkaline treated starch, bleached starch, roasted starch dextrins, distarch phosphate, hydroxypropyl distarch phosphate, acetylated distarch phosphate, hydroxypropyl starch, monostarch phosphate, oxidized starch, phosphated distarch phosphate, starch acetate, starch sodium octenyl succinate, and enzyme treated starches; mono-, di- and tri-calcium orthophosphate, Na, K, NH4 and Ca alginate, pectins, processed euchema seaweed, propylene glycol alginate, sodium chloride (salt), silicon dioxide, sodium aluminium diphosphate, sodium aluminium silicate, Sodium, potassium and calcium salts of fatty acids, starch, starch (sodium) octenyl succinate, starch acetate, sucro glycerides, sucrose, sucrose esters of fatty acids, type I and type II sucrose oligoesters, taragum, tragacanth, triethylcitrate, whey powder, xanthan gum, fibers such as non-starch polysaccharides, lignin, cellulose, methylcellulose, the hemicelluloses, β-glucans, mucilage, inulins, oligosaccharides, polydextrose, fructooligosaccharides, cyclodextrins, chitins, and combinations thereof, and thickeners such as carbomers, cellulose base materials, gums, waxes, algin, agar, pectins, carrageenan, gelatin, mineral or modified mineral thickeners, polyethylene glycol and polyalcohols, polyacrylamide and other polymeric thickeners, and combinations thereof.

It should also be understood, for example, that the Maillard reaction can be performed under conditions containing an excess of amine donors in comparison to reducing sugars or much less than the amount of reducing sugars present. In the first instance, the resultant MRPs would include unreacted amine donors, degraded amine donors and/or residues from reacted amine donors. Conversely, when there is an excess of reducing sugars present in the Maillard reaction, the amine donors would be more fully reacted during the reaction and a greater amount of unreacted reducing sugars as well as degraded reducing sugars and/or degrading reducing sugars and residues therefrom.

There are many ways to control the Maillard reaction to produce desired MRP compositions. For instance, adjusting the pH, pressure, reaction time, and ingredient additions to optimize the ratio of raw materials etc. Further, the separation of MRPs products can provide a means for preparing different types of flavors or flavor enhancers. For example, MRPs include both volatile substances and non-volatile substances. Therefore, by evaporating the volatile substances, non-volatile substances can be purified for use. These non-volatile substances (or products) can be used as flavor modifiers or with the top note flavor in final products, such as volatile peach, lemon flavor provided by traditional flavor houses.

Volatile substances can be used as flavor or flavor enhancers as well. Partial separation of MRPs can be carried out to obtain volatile substances, which can be further separated by distillation etc. or obtain non-volatile substances for instance by recrystallization, chromatograph etc. could be done to meet different targets of taste and flavor. Therefore, in this specification, MRPs include a composition including one or more volatile substances, one or more non-volatile substances or mixtures thereof. Non-volatile substances in MRPs or isolated from MRPs can provide a good mouth feel, umami and Kokumi taste.

Specifically, the following paragraphs enumerated consecutively from 1 through 103 provided for various aspects of the disclosure.

1. A plant-based meat composition, comprising a plant-based meat and Maillard reaction products (MRPs) added to the plant-based meat.

2. The composition as described in paragraph 1, wherein added MRPs is in an amount of 0.1-99.9 wt % of the composition.

3. A plant-based meat composition, comprising:
(1) a plant-based meat product and
(2) an added Maillard reaction product (MRP) formed from a Maillard reaction mixture comprising:
(a) one or more sugar donors; and
(b) one or more amine donors having a free amino group, wherein (a) and (b) undergo Maillard reaction in the absence of the plant-based meat product.

4. The plant-based meat composition as described in paragraph 3, wherein the MRP is present in a concentration range of 0.0001-10 wt % of the plant-based meat composition.

5. The plant-based meat composition as described in paragraph 3 or 4, wherein (a) and (b) undergo the Maillard reaction at a temperature in the range of 60° C. to 250° C.

6. The plant-based meat composition as described in paragraph 3 or 4, wherein (a) and (b) undergo the Maillard reaction at a temperature in the range of 80° C. to 120° C., preferably, 95-105° C.

7. The plant-based meat composition as described in any one of paragraphs 3-6, wherein the composition further comprising one or more sweeteners.

8. The plant-based meat composition as described in paragraph 7, wherein the sweeteners are selected from date paste, apple juice concentrate, monk fruit concentrate, sugar beet syrup, pear juice or puree concentrate and apricot juice concentrate.

9. The plant-based meat composition as described in any one of paragraphs 3-8, wherein the composition further comprising one or more high intensity sweeteners.

10. The plant-based meat composition as described in paragraph 9, wherein the high intensity sweeteners are selected from high intensity synthetic sweeteners, non-mogroside natural sweeteners, and/or the glycosylation products thereof.

11. The plant-based meat composition as described in any one of paragraphs 3-7, particular flavors may be produced from a Maillard reaction using one or more sugar donors, where at least one sugar donor is selected from plant juice/powder, vegetable juice/powder, berries juice/powder and fruit juice/powder.

12. The plant-based meat composition as described in any one of paragraphs 3-11, wherein at least one sugar donor and/or one amine donor is selected from animal source-based products, such as meat or oil.

13. The plant-based meat composition as described in any one of paragraphs 3-12, wherein the Maillard reaction mixtures may further include one or more carriers.

14. The plant-based meat composition as described in any one of paragraphs 3-12, wherein the Maillard reaction mixtures may further include one or more flavor carriers.

15. The plant-based meat composition as described in any one of paragraphs 3-14, wherein the MRP provides a flavor or a color.

16. The plant-based meat composition as described in any one of paragraphs 3-15, wherein the plant-based meat product has decreased or eliminated off-taste which includes any one of a bitter taste, a licorice-like taste, a metallic taste, an adverse taste, an astringent taste, a delayed sweetness onset, a lingering sweet aftertaste, and the like.

17. The plant-based meat composition as described in paragraph 16, wherein the MRP provides characteristic meat, burnt, roasted, caramellic, or chocolate taste profiles.

18. The plant-based meat composition as described in any one of paragraphs 3-17, wherein the MRP is obtained formed from a Maillard reaction mixture comprising sugar donor and amine donor which is any one selected from amino acids, peptides, proteins, proteolytic and nonenzymatic digests thereof; optional ingredients including any one of autolyzed yeast extracts, hydrolyzed vegetable proteins, gelatin (protein source), vegetable extracts (i.e., onion powder), enzyme treated proteins, meat fats or extracts and acids or bases if need.

19. The plant-based meat composition as described in any one of paragraphs 3-18, wherein the sugar donor is a reducing sugar.

20. The plant-based meat composition as described in paragraph 19, wherein the reducing sugar is any one selected from the group consisting of monosaccharides, disaccharides, oligosaccharides, polysaccharides (e.g., dextrins, starches, and edible gums) and their hydrolysis products.

21. The plant-based meat composition as described in paragraph 19, wherein the reducing sugar is aldoses or ketoses, which is preferably any one selected from the group consisting of erythrose, threose, rutinose, ribose, arabinose, xylose, lyxose, allose, altrose, glucose, mannose, maltose, gulose, cellobiose, glucuronolactone, lactose, idose, galactose, talose; fructose and rhamnose; lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose and xylobiose; erythrulose, ribulose, xylulose, xylitol, allulose, melezitose, talitol, inulin, stachyose, psicose, fructose, sorbose, and tagatose; alditol, glyceraldehyde, dihydroxyacetone, arabinose and ribose.

22. The plant-based meat composition as described in paragraph 19, wherein the reducing sugar is is uronic acids, which is preferably glucuronic acid, glucuronolactone, and galacturonic acid, mannuronic acid or iduronic acid or Maillard reaction intermediates bearing at least one carbonyl group which is preferably aldehydes, ketones, alpha-hydroxycarbonyl or dicarbonyl compounds.

23. The plant-based meat composition as described in any one of paragraphs 3-22, wherein the amino donor is one selected from amino acids, peptides, proteins, proteolytic and nonenzymatic digests thereof.

24. The plant-based meat composition as described in any one of paragraphs 3-22, wherein the amino donor is amino acid.

25. The plant-based meat composition as described in paragraph 24, wherein the amino acid is nonpolar amino acids, polar basic (positively charged) amino acids, and/or polar acidic (negatively charged) amino acids.

26. The plant-based meat composition as described in paragraph 25, wherein nonpolar amino acids are any one selected from alanine, glycine, isoleucine, leucine, methionine, tryptophan, phenylalanine, proline and valine; polar amino acids are any one selected from cysteine, serine, threonine, tyrosine, asparagine and glutamine; polar basic amino acids are any one selected from histidine and lysine; and polar acidic amino acids are any one selected from aspartate and glutamate.

27. The plant-based meat composition as described in any one of paragraphs 3-26, wherein the amino donor is one or more sulfur-containing group.

28. The plant-based meat composition as described in any one of paragraphs 3-26, the amino donor is from a plant source, such as vegetable juice, fruit juice and berry juice.

29. The plant-based meat composition as described in any one of paragraphs 3-28, wherein the amino donor is present in a range of 1 to 99 wt. % in the Maillard reaction mixture.

30. The plant-based meat composition as described in any one of paragraphs 3-29, wherein the MRP reaction mixture also comprises one or more carbohydrate sweeteners.

31. The plant-based meat composition as described in any one of paragraphs 3-29, wherein the carbohydrate sweeteners may be reducing sugars, or not reducing sugars which have acetal or ketal linkages and can be hydrolyzed.

32. The plant-based meat composition as described in any one of paragraphs 3-31, wherein the sugar donor and amino donor are present in the reaction mixture in a molar ratio of 10:1 to 1:10

33. The plant-based meat composition as described in any one of paragraphs 3-32, wherein the amino donor is one or more sulfur-containing group, which is in range of 1-99 wt %.

34. The plant-based meat composition as described in any one of paragraphs 3-33, wherein the raw materials for the MRP reaction mixture comprising any one of the following materials: 1) Protein nitrogen sources, 2) carbohydrate sources, 3) fat or fatty acid sources, and 4) additional ingredients selected from the group consisting of foodstuffs, herbs, spices, their extracts and/or flavoring agents; thiamine and/or its hydrochloric salt; water, ascorbic, citric, lactic, fumaric, malic, succinic, tartaric and the Na, K, Ca, Mg and/or NH4 salts of these acids; guanylic acid, inosinic acid and/or its Na, K and Ca salts; inositol, sodium, potassium and ammonium sulphides, hydrosulphides, and/or polysulphides; lecithin; acids, bases, and/or salts as pH regulators.

35. The plant-based meat composition as described in any one of paragraphs 3-33, wherein the raw materials for the MRP reaction mixture comprising any one of the following materials: sugar syrups, neat extracts, jardox, kanegrade, vegetable powders, egg yolk, vegetable oils, sauces, enzyme digests, and/or enzyme enhanced umami products.

36. A plant-based meat food, comprising a plant-based meat product and an added Maillard reaction products (MRPs) formed from a Maillard reaction mixture which include: (1) amino acid and (2) an sugar donor.

37. The plant-based meat food as described in paragraph 36, wherein the Maillard reaction mixture further comprises water and/or salts.

38. The plant-based meat food as described in paragraph 36 or 37, wherein the amino acid is selected from any one selected from cysteine, serine, threonine, tyrosine, asparagine and glutamine; polar basic amino acids are any one selected from histidine and lysine; and polar acidic amino acids are any one selected from aspartate and glutamate.

39. The plant-based meat food as described in paragraph 36 or 37, wherein the amino aicd is sulfur-containing amino acid, preferably thiamine and/or cysteine.

40. The plant-based meat food as described in any one of paragraphs 36-39, wherein the sugar donor is any one selected from the group consisting of erythrose, threose, rutinose, ribose, arabinose, xylose, lyxose, allose, altrose, glucose, mannose, maltose, gulose, cellobiose, glucuronolactone, lactose, idose, galactose, talose; fructose and rhamnose; lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose and xylobiose; erythrulose, ribulose, xylulose, xylitol, allulose, melezitose, talitol, inulin, stachyose, psicose, fructose, sorbose, and tagatose; alditol, glyceraldehyde, dihydroxyacetone, arabinose and ribose.

41. The plant-based meat food as described in any one of paragraphs 36-39, wherein the sugar donor is xylose.

42. A plant-based meat product, comprising added Maillard reaction products (MRPs), for improving the taste and/or flavor of the plant-meated product.

43. The plant-based meat product as described in any one of paragraphs 3-36, which is used as food or feed.

44. A method for improving the taste profile of a plant-based meat product, comprising:

adding a Maillard reaction product (MRP) composition during preparation of the plant-based meat product to produce a final product, wherein the MRP composition is produced by heating a reaction mixture comprising:

(a) one or more sugar donor; and (b) one or more amine donors comprising a free amino group, wherein (a) and (b) undergo a Maillard reaction, preferably the reaction temperature is in the range of 60° C. to 250° C.

45. The method as described in paragraph 44, wherein the reaction temperature is in the range of 80° C. to 120° C., preferably, 95-105° C.

46. The method as described in paragraph 44 or 45, wherein the Maillard reaction is conducted with a solvent.

47. The method as described in any one of paragraphs 44-46, wherein the solvent is one selected from the group consisting of methanol, ethanol, propanol, butanol, pentanol, hexanol, ethylene glycol, propylene glycol, butyl glycol; acetone, benzyl alcohol, 1,3-butylene glycol, carbon dioxide, castor oil, citric acid esters of mono- and di-glycerides, ethyl acetate, ethyl alcohol, ethyl alcohol denatured with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

48. The method as described in any one of paragraphs 44-46, wherein the solvent is one selected from acetic acid, benzyl alcohol, edible oils, ethyl alcohol, glycerol, hydrogenated vegetable oils, isopropyl alcohol, mannitol, propylene glycol, sorbitol, sorbitol syrup, water, and xylitol.

49. The method as described in any one of paragraphs 44-46, wherein the solvent is water, glycerol or mixture of glycerol and water.

50. The method as described in paragraph 49, wherein glycerol:water ratio (v:v) is 10:1 to 1:10 is in the mixture of glycerol and water.

51. The method as described in any one of paragraphs 44-50, wherein the Mailard reaction is carried out at a pH of from about 2-14, 52. The method as described in any one of paragraphs 44-50, wherein the Mailard reaction is conducted at a pH of from about 4-9, preferably 4.4-8.

53. The method as described in any one of paragraphs 44-52, wherein the Mailard reaction is conducted for 1 second to 100 hours.

54. The method as described in any one of paragraphs 44-52, wherein the Mailard reaction is conducted for 1.2 h-1.5 h.

55. The method as described in paragraph 54, wherein the Mailard reaction is conducted at the temperature of 95-105° C.

56. The method as described in any one of paragraphs 44-52, the Mailard reaction is a range of 10-800 MPa.

57. The method as described in any one of paragraphs 44-56, the Mailard reaction mixture comprising pH adjusting agents.

58. The method as described in any one of paragraphs 44-56, the Mailard reaction mixture comprising carries.

59. The method as described in any one of paragraphs 44-56, the MRP composition contains any one or more selected from the group consisting of furfural, nonanal, bis(2-furfuryl)disulfide, 2,4-di-tert-butylphenol and 2-(4-nitrobutyryl)-cyclopentanone.

60. A plant-based meat food, comprising:

added a Maillard reaction product (MRP) composition and a plant-meat product, wherein the MRP composition is produced by heating a reaction mixture comprising:

(a) one or more sugar donor; and (b) one or more amine donors comprising a free amino group, wherein (a) and (b) undergo a Maillard reaction, preferably the reaction temperature is in the range of 60° C. to 250° C.

61. A plant-based meat feed, comprising:

added a Maillard reaction product (MRP) composition and a plant-meat product, wherein the MRP composition is produced by heating a reaction mixture comprising:

(a) one or more sugar donor; and (b) one or more amine donors comprising a free amino group, wherein (a) and (b) undergo a Maillard reaction, preferably the reaction temperature is in the range of 60° C. to 250° C.

62. A meaty flavor composition, comprising:

an Maillard reaction product (MRP) formed from a Maillard reaction mixture comprising:

(a) one or more sugar donors; and (b) one or more amine donors having a free amino group.

63. The meaty flavor composition as described in paragraph 62, wherein the meaty flavor composition further comprises a plant-based meat product or authentic meat product.

64. The meaty flavor composition as described in paragraph 63, wherein the MRP is present in a concentration range of 0.001-100 wt % of the meaty flavor composition.

65. The meaty flavor composition as described in any one of paragraphs 62-64, wherein the composition further comprising one or more high intensity sweeteners which are selected from high intensity synthetic sweeteners, non-mogroside natural sweeteners, and/or the glycosylation products thereof.

66. The meaty flavor composition as described in any one of paragraphs 62-65, wherein the meaty flavor composition endows food or beverage or wine with decreased or eliminated off-taste which is any one of a bitter taste, a licorice-like taste, a metallic taste, an adverse taste, an astringent taste, a delayed sweetness onset, a lingering sweet aftertaste, and the like.

67. The meaty flavor composition as described in any one of paragraphs 62-65, wherein the meaty flavor composition endows food or beverage or wine with characteristic meat, burnt, roasted, caramellic, or chocolate taste profiles.

68. The meaty flavor composition as described in any one of paragraphs 62-67, wherein the MRP is obtained formed from a Maillard reaction mixture comprising sugar donor and amine donor which is any one selected from amino acids, peptides, proteins, proteolytic and nonenzymatic digests thereof; optional ingredients including any one of autolyzed yeast extracts, hydrolyzed vegetable proteins, gelatin (protein source), vegetable extracts (i.e., onion powder), enzyme treated proteins, meat fats or extracts and acids or bases if need.

69. The meaty flavor composition as described in any one of paragraphs 62-68, wherein the sugar donor is a reducing sugar.

70. The meaty flavor composition as described in paragraph 69, wherein the reducing sugar is any one selected from the group consisting of monosaccharides, disaccharides, oligosaccharides, polysaccharides (e.g., dextrins, starches, and edible gums) and their hydrolysis products.

71. The meaty flavor composition as described in paragraph 69, wherein the reducing sugar is aldoses or ketoses, which is preferably any one selected from the group consisting of erythrose, threose, rutinose, ribose, arabinose, xylose, lyxose, allose, altrose, glucose, mannose, maltose, gulose, cellobiose, glucuronolactone, lactose, idose, galactose, talose; fructose and rhamnose; lactulose, cellubiose, kojibiose, nigerose, sophorose, laminarbiose, gentiobiose, turanose, maltulose, palantinose, gentiobiulose, mannobiose, melibiose, melibiulose, rutinose, rutinulose and xylobiose; erythrulose, ribulose, xylulose, xylitol, allulose, melezitose, talitol, inulin, stachyose, psicose, fructose, sorbose, and tagatose; alditol, glyceraldehyde, dihydroxyacetone, arabinose and ribose.

72. The meaty flavor composition as described in paragraph 69, wherein the reducing sugar is is uronic acids, which is preferably glucuronic acid, glucuronolactone, and galacturonic acid, mannuronic acid or iduronic acid or Maillard reaction intermediates bearing at least one carbonyl group which is preferably aldehydes, ketones, alpha-hydroxycarbonyl or dicarbonyl compounds.

73. The meaty flavor composition as described in any one of paragraphs 62-72, wherein the amino donor is one selected from amino acids, peptides, proteins, proteolytic and nonenzymatic digests thereof.

74. The meaty flavor composition as described in any one of paragraphs 62-72, wherein the amino donor is amino acid.

75. The meaty flavor composition as described in paragraph 74, wherein the amino acid is nonpolar amino acids, polar basic (positively charged) amino acids, and/or polar acidic (negatively charged) amino acids.

76. The meaty flavor composition as described in paragraph 75, wherein nonpolar amino acids are any one selected from alanine, glycine, isoleucine, leucine, methionine, tryptophan, phenylalanine, proline and valine; polar amino acids are any one selected from cysteine, serine, threonine, tyrosine, asparagine and glutamine; polar basic amino acids are any one selected from histidine and lysine; and polar acidic amino acids are any one selected from aspartate and glutamate.

77. The meaty flavor composition as described in any one of paragraphs 62-76, wherein the amino donor is one or more sulfur-containing group.

78. The meaty flavor composition as described in any one of paragraphs 62-77, the amino donor is from a plant source, such as vegetable juice, fruit juice and berry juice.

79. The meaty flavor composition as described in any one of paragraphs 62-78, wherein the amino donor is present in a range of 1 to 99 wt. % in the Maillard reaction mixture. 80. The meaty flavor composition as described in any one of paragraphs 62-79, wherein the MRP reaction mixture also comprises one or more carbohydrate sweeteners.

81. The meaty flavor composition as described in any one of paragraphs 62-78, wherein the sugar donor and amino donor are present in the Maillard reaction mixture in a molar ratio of 10:1 to 1:10.

82. The meaty flavor composition as described in any one of paragraphs 62-80, wherein the amino donor is one or more sulfur-containing group.

83. A method for producing the meaty flavor composition as described in any one of paragraphs 62-82, comprising:

preparing a Maillard reaction product (MRP) composition as the meaty flavor composition, wherein the MRP composition is produced by heating a Maillard reaction mixture comprising:

(a) one or more sugar donor; and (b) one or more amine donors comprising a free amino group, wherein (a) and (b) undergo a Maillard reaction, preferably the reaction temperature is in the range of 60° C. to 250° C.

84. The method for producing the meaty flavor composition as described in paragraph 83, wherein the method comprises the step of mixing Maillard reaction product (MRP) composition with the plant-based meat product as the meaty flavor composition.

85. The method for producing the meaty flavor composition as described in paragraph 83 or paragraph 84, wherein the reaction temperature is in the range of 80° C. to 120° C., preferably, 10-105° C.

86. The method as described in any one of paragraphs 83-85, wherein the Maillard reaction is conducted with a solvent.

87. The method as described in any one of paragraphs 83-86, wherein the solvent is one selected from the group consisting of methanol, ethanol, propanol, butanol, pentanol, hexanol, ethylene glycol, propylene glycol, butyl glycol; acetone, benzyl alcohol, 1,3-butylene glycol, carbon dioxide, castor oil, citric acid esters of mono- and di-glycerides, ethyl acetate, ethyl alcohol, ethyl alcohol denatured with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

88. The method as described in any one of paragraphs 83-86, wherein the solvent is one selected from acetic acid, benzyl alcohol, edible oils, ethyl alcohol, glycerol, hydrogenated vegetable oils, isopropyl alcohol, mannitol, propylene glycol, sorbitol, sorbitol syrup, water, and xylitol.

89. The method as described in any one of paragraphs 83-86, wherein the solvent is water, glycerol or mixture of glycerol and water.

90. The method as described in paragraph 89, wherein glycerol:water ratio (v:v) is 10:1 to 1:10 is in the mixture of glycerol and water.

91. The method as described in any one of paragraphs 83-90, wherein the Mailard reaction is carried out at a pH of from about 2-14.

92. The method as described in any one of paragraphs 83-90, wherein the Mailard reaction is conducted at a pH of from about 4-9, preferably 4.4-8.

93. The method as described in any one of paragraphs 83-92, wherein the Mailard reaction is conducted for 1 second to 100 hours.

94. The method as described in any one of paragraphs 83-92, wherein the Mailard reaction is conducted for 1.2 h-1.5 h.

95. The method as described in paragraph 94, wherein the Mailard reaction is conducted at the temperature of 95-105° C.

96. The method as described in any one of paragraphs 83-92, wherein the Mailard reaction is a range of 10-800 MPa.

97. The method as described in any one of paragraphs 83-96, wherein the Mailard reaction mixture comprises pH adjusting agents.

98. The method as described in any one of paragraphs 83-97, wherein the Mailard reaction mixture comprising carriers.

99. The method as described in any one of paragraphs 83-98, the MRP composition containing one or more selected from the group consisting of furfural, nonanal, bis(2-furfuryl)disulfide, 2,4-di-tert-butylphenol and 2-(4-nitrobutyryl)-cyclopentanone.

100. A use of the meaty flavor composition as described in any one of paragraphs 62-82, which is added to any one of food or beverage or wine.

101. The use of the meaty flavor composition as described in paragraph 100, which is added to any one of food or beverage or wine selected from the group consisting of a dairy product, fat emulsion, fruit or vegetable, juice, tea, coffee, fruit or vegetable nectar, water-based flavored drink, herbal infusion, hot cereal beverage, non-alcoholic beverage, alcoholic beverage, beer or malt beverage, cider and perry, wine, fruit wine, spirituous beverages, dessert, cream, milk or cream powder, cheese, whey product, edible ice, a fruit product, a vegetable product, nut or seed product, jam, jelly, spread, fruit topping, fruit filling, candy, cocoa product, sugar-based confectionery, chewing gum, decoration product, sauce, grain product, flour or starch, breakfast cereal product, rolled oats product, pastas or noodle, cereal, bread, cracker, cake, cookie, pie, bakery ware, doughnut, sweet roll, scone, muffin, meat product, fish product, egg product, salt, seasoning, vinegar, mustard product, spice product, soup, sauce, salad, yeast product, protein product, foodstuff, ready-to-eat savory, and a composite food.

102. The use of the meaty flavor composition as described in paragraph 100 or 101, which is added by 0.0001-30 wt % to any one of said food or beverage or wine.

103. The use of the meaty flavor composition as described in paragraph 100 or 101, wherein the MRP is present in the food or beverage or wine in a concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

The follow examples are used to fully understand the technical solution of the invention.

The invention will now be illustrated by the following examples which however do not intent to be limiting. Specifically, the source and puritity of the compounds used in the following examples and apparatus models are given as Table A.

TABLE A

| Material | Manuafacturer and Seller | Purity | Lot Number |
|---|---|---|---|
| citric acid | Ma'anshan COFCO Biochemistry Co. LTD | ≥99.0% | 202006067N |
| L-methionine | Tianjin Guangfu Fine Chemical Research Institute | ≥98.5% | Aug. 14, 2018 |
| xylose | Zhejiang Huakang Pharmaceutical Co., LTD | ≥98.5% | XR1220005 |
| disodium phosphate solution | Tianjin Guangfu Fine Chemical Research Institute | ≥99.0% | Apr. 12, 2019 |
| L-cysteine | Tianjin Guangfu Fine Chemical Research Institute | ≥98.5% | 20201208 |

GC-MS Conditions:

The samples were analyzed by solid-phase micro extraction in tandem with gas chromatography coupled to mass spectrometry (SPME-GC-MS).

Instrument

GC: Thermoscientific GC1300, MS: ISQ 7000

Software: Xcalibur

27

Column

TG-5 MS, 30 m×0.25 mm×0.25 μm (thermoscientific, USA).

GC Conditions

Oven: 35° C. initial 2 min, @5° C./min to 150° C., 10° C./min to 260° C.

Carrier gas: He, 1.5 mL/min

Injection port: 250° C.

Split: 20

MS Conditions

Transfer line: 230° C.

EI: 230° C.

Sample Preparation

SPME was employed using a PDMS fiber, Each sample was dissolved in 5 ml water with 0.2 g/ml NaCl, and conditioned for 30 min at 65° C. After 15 min extraction of sample, the fiber was thermally desorbed in the injector port of the GC at 250° C., for 5 min.

Example 01

Materials: citric acid and disodium phosphate solution, cysteine, methionine, water, xylose, oven, beakers, flasks, transfer pipette gun, gloves, electric heating mantle Procedure:

Mix 35.814 g of $Na_2HPO_4$ (s) and 500 ml of water to create 0.2M $Na_2HPO_4$ solution, Mix 9.62 g anhydrous citric acid and 500 ml water to create 0.1M citric acid solution.

Prepare pH 8.0 buffer solution by mixing 19.45 ml disodium phosphate and 0.55 ml citric acid.

Prepare pH 4.4 buffer solution by mixing 8.82 ml disodium phosphate and 11.18 ml citric acid.

Weigh and mix 4.5 g of the amino acid, 3 g xylose, 3.5 g buffer solution. Then put them into oven for 100° C. and obtained MRPs sample by reaction. Specifically, this step is done for the following conditions as given in Table 01.

TABLE 01 the reaction conditions used for trial preparation of MRP samples

| Sample number | Reactants | pH | time |
|---|---|---|---|
| Sample 01 | Cysteine + xylose + buffer solution | 4.4 | 1.5 hours |
| Sample 02 | Cysteine + xylose + buffer solution | 8.0 | 1.5 hours |
| Sample 03 | Cysteine + xylose + buffer solution | 4.4 | 2 hours |
| Sample 04 | Cysteine + xylose + buffer solution | 8.0 | 2 hours |
| Sample 05 | Methionine + xylose + buffer solution | 1.5 | 1.5 hours |
| Sample 06 | Methionine + xylose + buffer solution | 0.5 | 0.5 hour |

Example 02 Sensory Evaluation

Materials and apparatus: MRP samples 01 to 06, Beyond Meat plant-based Burger Meat (Lot Number: Z1B01 116917906, Date of Production 20210618), frying pan, cooking bench, cooking shovel, cooking olive oil, timer Sensory Panel: 6 People The Procedure of Cooking:

2 ml of the MRP Samples 01-05 from Example 01 is respectivly added into 113 g Beyond burger patty (one serving)

Homogenise by mixing to make sure the flavour is well mixed.

Cook the Beyond Burger Meat (plant-based) patty as per instruction, each side of the burger patty is cooked for 3 minutes on the frying pan.

28

The Procedure of Sensory Evaluation:

Before the tasting takes place, the panellists are to be informed of the upcoming series of samples and taste reference samples (without added flavour) to find a common sense of the description.

The flavoured samples were tested at the use level to find a common sense on how to describe the flavours of each sample (in terms of taste, smell, intensity). Six trained panellists tasted all samples of a series blindly and independently. They were allowed to re-taste and make notes of the sensory attributes perceived for each sample respectively.

The attributes noted were discussed openly to find a compromise description. Specifically, sensory evalution results were shown in the following Table 02.

TABLE 02 sensory evaluation results

| sample | Aroma | Taste |
|---|---|---|
| Reference | No-meat smell | Beany taste and after-taste, granular-feeling, not chewing, mouth-dry, lack of meat taste, no fatty-feeling, typical soybean taste, no elastic meat texture. |
| Sample 1 | Strong meaty smell | Strong meat taste(relatively), juicy, slightly oily, very little beany aftertaste |
| Sample 2 | light meat smell | Slight meat taste, granular-feeling, not juicy, reduced beany after taste stronger than sample 01 but less than reference |
| Sample 3 | Medium meat smell | Medium meat taste, not juicy, medium granular-feeling, almost no beany taste like sample 01 |
| Sample 4 | Medium meat smell | Medium meat taste, not juicy, medium granular-feeling, not oily, not fatty, almost no beany taste like sample 01 |
| Sample 5 | Slightly meat smell | Almost no effect |
| Sample 5 | Slightly meat smell | Almost no effect |

Conclusion: Adding MRPs such as methionine or cysteine derived mallard reacted products in plant-based meat could improve quality of plant-based meat significantly. It could enhance the meat smell, meat taste and juiciness and texture. It could also mask the bean off-note. The amino acids used in the mallard reaction could be totally dissolved or partially dissolved. Both provide additional opportunities to have further maillard reaction when cooking together with plant-based meat.

Example 03

Materials and apparatus: thiamine, cysteine, xylose, buffer solution of pH 4.4, clamps, Stands, electric heating mantle, laboratory mixer, 4-neck flask, thermometer, timer, reflux tube Procedure:

Weigh out equimolar amounts of amino compound and xylose, and buffer solution of the same mass as the xylose, and add into a 4-neck flask, wherein the buffer solution is prepared by mixing 8.82 ml disodium phosphate and 11.18 ml citric acid according to the method of preparing pH 4.4 buffer solution in Example 01.

For samples with reaction temperature at 120° C.: pour silicone oil into the according space in the oil bath apparatus, set up the apparatus including a reflux tube, and laboratory mixer then set the temperature to 120° C.

For samples with reaction temperature at 100° C.: set up the apparatus, let the flask sit inside the electric heating mantle.

Start the laboratory mixer to mix the reactants, start the timer when the desired temperatures are reached Obtain MRP samples after the respective reaction times. Specifically, this step is done for the following reaction conditions as given in Table 03.

TABLE 03 the reaction conditions used for trial preparation of MRP samples

| Reactants | Reaction temperature | Reaction time | | pH |
|---|---|---|---|---|
| xylose + cysteine + buffer solution | 100° C. | 1 | hour | 4.4 |
| xylose + thiamine + buffer solution | 100° C. | 1.5 | hours | 4.4 |
| xylose + cysteine + buffer solution | 100° C. | 1.5 | hours | 4.4 |
| xylose + cysteine + buffer solution | 120° C. | 0.5 | hours | 4.4 |
| xylose + thiamine + buffer solution | 120° C. | 0.5 | hours | 4.4 |
| xylose + thiamine + buffer solution | 120° C. | 1 | hour | 4.4 |

Example 04 Preparation for Sensory Evaluation

Materials and apparatus: beyond meat burger patties, authentic cooked beef burger patty (as a reference for training), six different MRP samples prepared in example 03, measuring cylinder, pipette, frying pan, cooking bench, cooking shovel, oil, timer, spoon
Procedure:

Before the tasting, the panellists are trained with the attributes of authentic meat based on standards set by the American Meat Science Association.

They were each given a piece of authentic beef patty bought from McDonald Beijing as a reference.

A form was designed and handed out to the panellist.

Beyond Burger Meat was cooked: in the case of burger patties with MRPs added, MRP samples prepared in example 03 are added into each 113 g Beyond burger patty (one serving), the samples are measured using a measuring cylinder, homogenised with the plant-based meat by mixing with a spoon, each side is fried for three minutes. The samples' sensory evaluation results were shown in the following Table 04-1.

TABLE 04-1

The MRPs samples added to the plant-based meat in Sensory evaluation of example 04

| Sample | Ingredients and reaction conditions | Portion |
|---|---|---|
| 6 | Cysteine + xylose 1 hour 100° C. | 2 ml |
| 7(control) | N/A (pure beyond burger meat) | 0 |
| 8 | Thiamine + xylose 1.5 hours 100° C. | 2 ml |
| 9 | Cysteine + xylose 0.5 hours 120° C. | 2 ml |
| 10 | Thiamine + xylose 0.5 hours 120° C. | 2 ml |
| 11 | Thiamine + xylose 1 hour 120° C. | 2 ml |
| 12 | Thiamine + xylose 1 hour 120° C. | 1 ml |
| 13 | Thiamine + xylose 1.5 hours 100° C. | 1 ml |
| 14 | Cysteine + xylose 1 hour 100° C. | 1 ml |
| 15 | Cysteine + xylose 1.5 hour 100° C. | 1 ml |

Sensory Evaluation
Sensory Evaluation Panel: 6 Trained People
Materials and Apparatus: cooked plant-based meat samples, printed forms, pen, forks
Procedure:

The panellists each receive a piece of the plant-based meat sample and taste it. They are asked to fill in the forms. Forms are then collected after all samples were served. Specifically, sensory evaluation results of samples were shown in the following Table 04-2.

TABLE 04-2

Sensory evaluation example 04 results

| | Average |
|---|---|
| Sample 6: | |
| Fat-like | 3.25 |
| Red meat aroma | 2.17 |
| Beef taste | 2.80 |
| Beany aftertaste | 2.50 |
| Granular texture | 2.33 |
| Overall meat-like | 3.17 |
| Sample 7: (plain plant-based meat): | |
| Fat-like | 3.58 |
| Red meat aroma | 3.17 |
| Beef taste | 3.10 |
| Beany aftertaste | 2.33 |
| Granular texture | 1.58 |
| Overall meat-like | 3.63 |
| Sample 8: | |
| Fat-like | 3.75 |
| Red meat aroma | 2.33 |
| Beef taste | 2.40 |
| Beany aftertaste | 3.00 |
| Granular texture | 3.08 |
| Overall meat-like | 2.75 |
| Sample 9: | |
| Fat-like | 3.87 |
| Red meat aroma | 2.67 |
| Beef taste | 3.30 |
| Beany aftertaste | 2.17 |
| Granular texture | 1.92 |
| Overall meat-like | 3.95 |
| Sample 10: | |
| Fat-like | 3.92 |
| Red meat aroma | 3.33 |
| Beef taste | 3.80 |
| Beany aftertaste | 1.58 |
| Granular texture | 1.25 |
| Overall meat-like | 4.25 |
| Sample 11: | |
| Fat-like | 4.17 |
| Red meat aroma | 3.42 |
| Beef taste | 3.70 |
| Beany aftertaste | 1.42 |
| Granular texture | 1.33 |
| Overall meat-like | 4.00 |
| Sample 12: | |
| Fat-like | 4.50 |
| Red meat aroma | 3.83 |
| Beef taste | 4.00 |
| Beany aftertaste | 0.33 |
| Granular texture | 1.00 |
| Overall meat-like | 4.77 |
| Sample 13: | |
| Fat-like | 4.83 |
| Red meat aroma | 4.38 |
| Beef taste | 4.26 |
| Beany aftertaste | 0.25 |
| Granular texture | 0.08 |
| Overall meat-like | 4.77 |
| Sample 14: | |
| Fat-like | 4.25 |
| Red meat aroma | 3.58 |
| Beef taste | 3.90 |
| Beany aftertaste | 0.92 |
| Granular texture | 1.00 |
| Overall meat-like | 4.28 |
| Sample 15: | |
| Fat-like | 4.88 |
| Red meat aroma | 4.23 |

TABLE 04-2-continued

| Sensory evaluation example 04 results | |
|---|---|
| | Average |
| Beef taste | 4.56 |
| Beany aftertaste | 0.33 |
| Granular texture | 0.25 |
| Overall meat-like | 4.40 |

Notes;

1)The attributes: overall meat-like, fat-like, red meat aroma and beef taste are being identified as authentic meat's properties. For each of these attributes, the higher the score out of 5, the more palatable the sample is.

2)While the negative attributes of granular texture and beany aftertaste have been identified as plant-based meat's flavour defects. The lower the score, the more palatable the sample is.

3)Scores are out of 5.

Example 05

Materials and apparatus: thiamine, cysteine, xylose, buffer solution of pH 4.4, stands, clamps, stands, electric heating mantle, laboratory mixer, 4-neck flask, thermometer, timer, reflux tube, silicone oil, oil bath Procedure:

Weigh out equimolar amounts of amino compound and xylose, and buffer solution of the same mass as the xylose, and add each of them into a 4-neck flask.

For sample 16 and 17: pour silicone oil into the according space in the oil bath apparatus, set up the apparatus including a reflux tube, and laboratory mixer then set the temperature to 120° C.

For sample 18 and 19: set up the apparatus, let the flask sit inside the electric heating mantle.

Start the laboratory mixer to mix the reactants, start the timer when the desired temperatures are reached.

After the respective times (0.5 hours for samples 16 and 17, 1.5 hours for samples 18 and 19), the MRP sample was obainted. Specifically, the reation condition was shown in Table 05.

TABLE 05

| | | Different reaction conditions of samples | | |
|---|---|---|---|---|
| Sample: | Amino compound type | Temperature | Reaction time | pH |
| 16 | Cysteine | 120° C. | 0.5 hours | 4.4 |
| 17 | Thiamine | 120° C. | 0.5 hours | 4.4 |
| 18 | Cysteine | 100° C. | 1.5 hours | 4.4 |
| 19 | Thiamine | 100° C. | 1.5 hours | 4.4 |

Example 06

Materials and apparatus: beyond meat burger patties, authentic cooked beef burger patty (for attribute training), 4 different MRPs samples, measuring cylinder, pipette, frying pan, cooking bench, cooking shovel, oil, timer, spoon Sensory evaluation panel: the same 6 trained people as the last round of sensory evaluation Procedure:

Before the tasting, the panellists are trained with the attributes of authentic meat based on standards set by the American Meat Science Association.

They were each given a piece of authentic beef patty from McDonald's as a reference.

A form was designed and handed out to the panellist.

Beyond Burger Meat was cooked: in the case of burger patties with MRPs added, 1 ml MRP samples in Example 05 are added into each 113 g Beyond burger patty (one serving), the samples are measured using a measuring cylinder, homogenised with the plant-based meat by mixing with a spoon, each side is fried for three minutes. The samples were prepared from Example 05:

Sensory Evaluation:

Sensory Evaluation Panel: The Same 6 Trained People as the Last Round of Sensory Evaluation Materials and apparatus: cooked plant-based meat samples, printed forms, pen, forks Procedure:

The panellist each receive a piece of the plant-based meat sample and taste it.

They are asked to fill in the forms. Forms are then collected after all samples were served. Specifically, sensory evaluation results of samples were shown in the following Table 06.

TABLE 06

| | | | | | | | | Sensory evaluation results (show in next page) | |
|---|---|---|---|---|---|---|---|---|---|
| | person 1 | person 2 | person 3 | person 4 | person 5 | person 6 | Average | Average for meat properties | Average for plant-based meat properties/flaws |
| Sample 16: | | | | | | | | | |
| Fat-like | 4.00 | 3.00 | 5.00 | 4.00 | 3.00 | 4.00 | 3.83 | 3.58 | 1.63 |
| Red meat aroma | 4.00 | 2.00 | 4.00 | 3.00 | 2.00 | 3.00 | 3.00 | | |
| Beany aftertaste | 0.00 | 5.00 | 0.50 | 1.00 | 1.00 | 1.00 | 1.42 | | |
| Granular texture | 1.00 | 2.00 | 1.00 | 3.00 | 2.00 | 2.00 | 1.83 | | |
| Overall meat-like | 4.00 | 3.50 | 4.70 | 4.00 | 3.50 | 4.50 | 4.03 | | |
| Beef taste | 4.00 | 3.00 | 5.00 | 4.00 | 3.00 | 4.00 | 3.83 | | |
| Sample 17: | | | | | | | | | |
| Fat-like | 4.00 | 3.50 | 5.00 | 4.10 | 3.50 | 4.00 | 4.02 | 3.57 | 1.73 |
| Red meat aroma | 5.00 | 1.50 | 4.00 | 4.00 | 3.00 | 5.00 | 3.75 | | |
| Beany aftertaste | 1.00 | 1.00 | 1.00 | 2.00 | 1.20 | 1.00 | 1.20 | | |
| Granular texture | 1.00 | 2.00 | 1.00 | 4.00 | 2.50 | 3.00 | 2.25 | | |
| Overall meat-like | 4.00 | 3.00 | 4.50 | 3.00 | 3.00 | 3.00 | 3.42 | | |
| Beef taste | 4.00 | 2.00 | 4.00 | 3.00 | 2.50 | 3.00 | 3.08 | | |

TABLE 06-continued

| | person 1 | person 2 | person 3 | person 4 | person 5 | person 6 | Average | Average for meat properties | Average for plant-based meat properties/flaws |
|---|---|---|---|---|---|---|---|---|---|
| Sensory evaluation results (show in next page) | | | | | | | | | |
| Sample 18: | | | | | | | | | |
| Fat-like | 5.00 | 3.50 | 5.00 | 4.50 | 3.80 | 4.00 | 4.30 | 4.06 | 1.08 |
| Red meat aroma | 5.00 | 2.50 | 4.00 | 4.50 | 3.00 | 2.00 | 3.50 | | |
| Beany aftertaste | 0.00 | 0.50 | 1.00 | 1.00 | 1.00 | 1.00 | 0.75 | | |
| Granular texture | 1.00 | 1.50 | 1.00 | 2.00 | 1.00 | 2.00 | 1.42 | | |
| Overall meat-like | 5.00 | 4.00 | 4.60 | 4.50 | 3.80 | 3.50 | 4.23 | | |
| Beef taste | 5.00 | 3.00 | 5.00 | 4.50 | 3.80 | 4.00 | 4.22 | | |
| Sample 19: | | | | | | | | | |
| Fat-like | 5.00 | 3.50 | 5.00 | 4.80 | 4.00 | 5.00 | 4.55 | 4.03 | 0.96 |
| Red meat aroma | 5.00 | 1.50 | 5.00 | 4.50 | 3.00 | 4.00 | 3.83 | | |
| Beany aftertaste | 0.00 | 1.00 | 1.00 | 0.00 | 1.00 | 0.00 | 0.50 | | |
| Granular texture | 0.00 | 2.50 | 1.00 | 1.00 | 1.00 | 3.00 | 1.42 | | |
| Overall meat-like | 5.00 | 3.00 | 4.50 | 5.00 | 3.50 | 3.00 | 4.00 | | |
| Beef taste | 5.00 | 2.00 | 4.00 | 5.00 | 3.50 | 3.00 | 3.75 | | |

Figure 1:
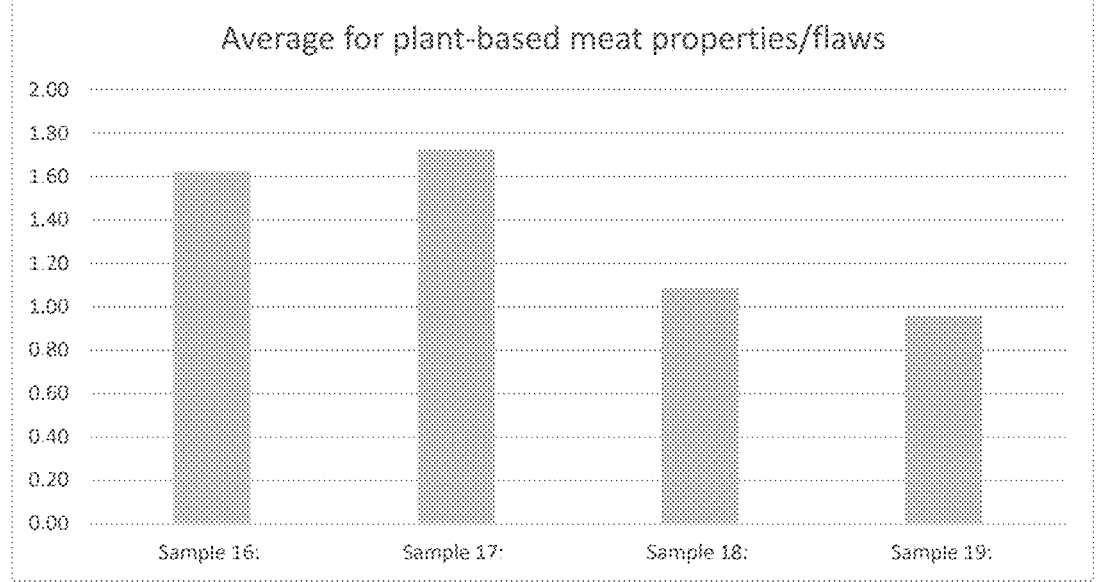
FIG. 1 is means for meat properties of plant-based meat in Example 06.
Figure 2:
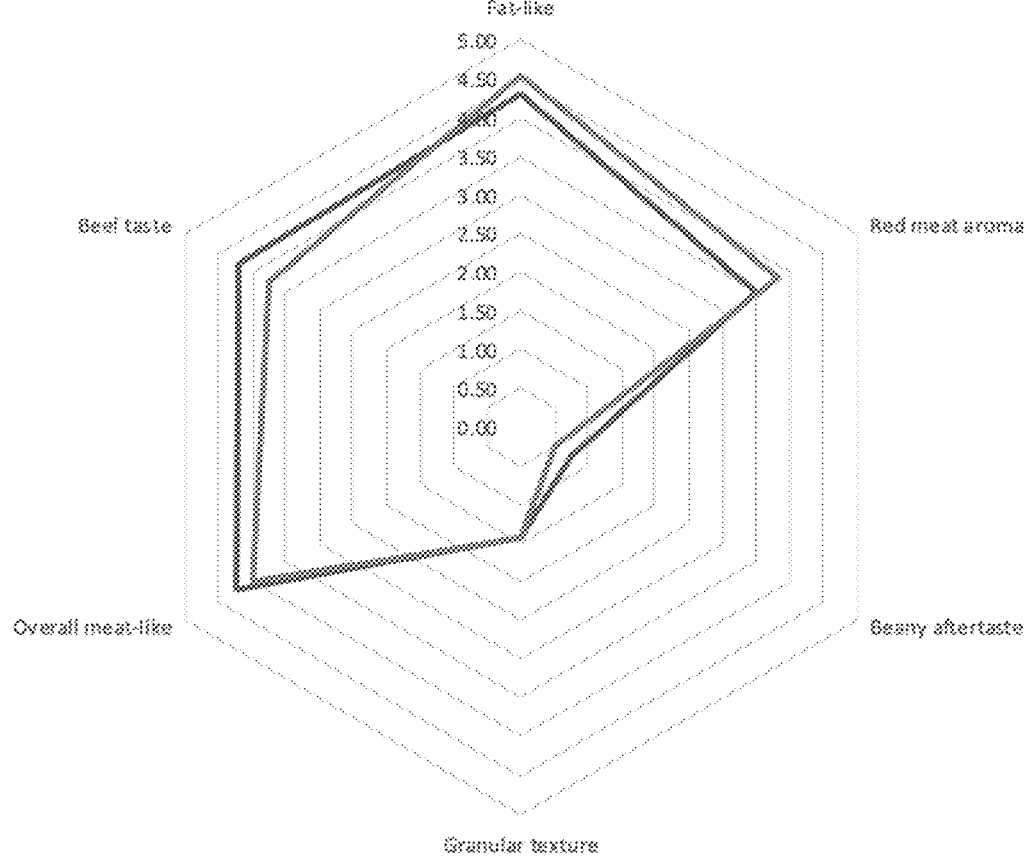
FIG. 2 is comparison of the means of Sample 18 and 19 in Example 06.

Conclusion: The result showed that adding MRPs products could improve the meat aroma and taste of plant-based meat. FIG. 1 is means for meat properties of plant-based meat in Example 06;

FIG. 2 is comparison of the means of Sample 18 and 19 in Example 06; The samples 18 and 19 prepared with the amino compounds cysteine and thiamine respectively, both from the condition of 100° C./1.5 hours scored significantly better than samples 16 and 17 both in terms of enhancing the meat properties attributes and reducing the plant-based meat flavour defects. They achieved very similar scores in these attributes, with sample 18 scoring slightly higher in enhancing the meat-like properties and sample 19 scoring slightly better in reducing the defects of plant-based meat. The preferable MRPs is prepared at temperature below 100° C. Sample 18 and 19 are then sent to do GC-MS analysis.

Example 07 Detection of Key Volatile Substances Through GC-MS in Meat Flavours after Maillard Reaction Procedure:
1. Sample Preparation: the samples were dissolved in 4.50 mL of sodium chloride solution (0.2 g/L) to 20-mL headspace vials.
2. Analysis: The samples were analysed by solid-phase micro extraction in tandem with gas chromatography coupled to mass spectrometry (SPME-GC-MS), Table 07-1 below shows the detailed conditions:

TABLE 07-1

| The method conditions of GC-MS | |
|---|---|
| GC1300 | |
| Column | TG-5MS, 30 m × 0.25 mm × 0.25 μm |
| Oven | 35° C. initial 2 min, @5° C./min to 150° C., 10° C./min to 260° C. |
| Carrier gas | He, 1.5 mL/min |
| Injection port | 250° C. |
| Split | 20 |
| ISQ 7000 | |
| Transfer line | 230° C. |
| EI | 230° C. |
| SPME | |
| Extract | 65° C.; 30 min |
| Incubation time | 5 min |

Peak areas were integrated using the TIC signals, the respective compounds were determined using the relative signal intensities of the analysed ions (m/z) in the mass spectrum.

GC-MS Results

Figure 3B:
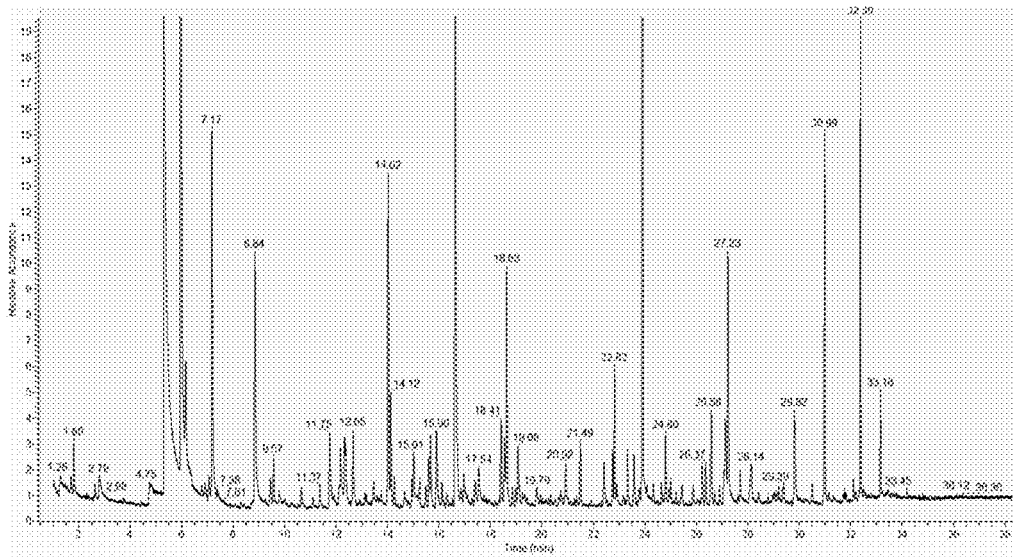
FIG. 3B is enlarge image of 3A.

The MRP samples obtained were analysed by GC-MS. The total ions chromatogram for each sample was obtained, as shown in FIG. 3A, FIG. 3B, FIG. 5A and FIG. 5B. FIG. 3A and FIG. 3B are the total ions chromatography of aroma compounds in sample 18 (containing cysteine); Table 07-2 shows the Area-% of each identified peak of each main volatile substance in sample 18 and FIG. 4A-FIG. 4F are mass spectrums of a part of compounds in the total ions chromatography as shown in FIG. 3A, which are respectively of compounds furfural, 2-methyl-3-furanthiol, 2-furfurylthiol, 2-thiophenethiol, 2,5-thiophenedicarboxaldehyde and furan, 3,3'-dithiobis[2-methyl-. While FIG. 5A and FIG. 5B are the total ions chromatography of aroma compounds in sample 19 (containing thiamine), and Table 07-3 shows the numerical values of each main volatile substance found in sample 19 and FIG. 6A-FIG. 4C are mass spectrums of a part of compounds in the total ions chromatography as shown in FIG. 4A, which are respectively of compounds furfural, bis(2-furfuryl)disulfide and barbituric acid, 2-thio-.

TABLE 07-2

| The major volatile substances of sample 18 | | |
|---|---|---|
| RT (min) Compound Name | CAS | peak areas percentage/% 0812-2 |
| 1.80 Furan, 2-methyl- | 534-22-5 | 0.51 |
| 5.29 Furfural | 98-01-1 | 7.01 |
| 5.96 2-Methyl-3-furanthiol | 28588-74-1 | 12.35 |
| 6.15 Thiophene, 2,4-dimethyl- | 638-00-6 | 0.91 |
| 7.05 2-Butanethiol | 513-53-1 | 0.30 |
| 7.17 2-Furfurylthiol | 98-02-2 | 3.99 |
| 8.84 2-Thiophenethiol | 7774-74-5 | 2.64 |
| 9.44 3(2H)-Thiophenone, dihydro-2-methyl- | 13679-85-1 | 0.30 |
| 11.75 2-Amino-4,5-dimethylthiazole | 2289-75-0 | 0.99 |
| 12.17 Benzaldehyde, 2-methyl- | 529-20-4 | 0.67 |
| 12.33 2-Thiophenemethanol | 636-72-6 | 0.52 |
| 12.36 1,1-Bis(ethylthio)ethene | 4992-59-0 | 0.57 |
| 12.65 Nonanal | 124-19-6 | 0.87 |
| 14.12 2-Amino-4,5-dimethylthiazole | 2289-75-0 | 1.17 |
| 14.26 2-Acetyl-3-methylthiophene | 13679-72-6 | 0.34 |

TABLE 07-2-continued

The major volatile substances of sample 18

| RT (min) | Compound Name | CAS | peak areas percentage/% 0812-2 |
|---|---|---|---|
| 14.94 | Bis(2-furfuryl)disulfide | 4437-20-1 | 0.24 |
| 15.01 | 5-ethyl-4-methylthiazole | 31883-01-9 | 0.56 |
| 15.60 | meta-Methoxybenzenethiol | 15570-12-4 | 0.57 |
| 15.68 | Thieno[2,3-b]thiophene | 250-84-0 | 0.83 |
| 15.90 | 2-Acetylthiazole | 24295-03-2 | 1.03 |
| 16.62 | 2,5-Thiophenedicarboxaldehyde | 932-95-6 | 6.65 |
| 16.96 | 2-Benzothiazolol | 934-34-9 | 0.33 |
| 17.54 | Thiophene, 3-(1,1-dimethylethyl)- | 1689-79-8 | 0.51 |
| 18.41 | 2,4,6-Trihydroxybenzaldehyde | 487-70-7 | 0.96 |
| 18.54 | ĕ2-Tetrazaboroline, 1,4,5-triethyl- | 20534-04-7 | 0.58 |
| 19.08 | Furan, 2,2'-(1,2-ethenediyl)bis-, (E)- | 1439-19-6 | 0.74 |
| 20.92 | 1,2-Benzenedithiol, 4-methyl- | 496-74-2 | 0.58 |
| 21.49 | 2-Furancarbodithioic acid, ethyl ester | 20849-29-0 | 0.73 |
| 22.41 | 1-tetradecylene | 1120-36-1 | 0.59 |
| 22.74 | Nonadecane | 629-92-5 | 0.49 |
| 23.33 | 4(1H)-Pyrimidinone, 6-amino-2,3-dihydro-2-thioxo- | 1004-40-6 | 0.60 |
| 23.58 | 2,4-Di-tert-butylphenol | 96-76-4 | 0.64 |
| 23.91 | Furan, 3,3'-dithiobis[2-methyl- | 28588-75-2 | 25.67 |
| 24.80 | Glutaric acid | 110-94-1 | 0.77 |
| 26.23 | Bis(2-furfuryl)disulfide | 4437-20-1 | 0.44 |
| 26.37 | Decanoic acid, octyl ester | 2306-92-5 | 0.48 |
| 27.13 | Hexanedioic acid, bis(2-methylpropyl) ester | 141-04-8 | 1.02 |
| 27.23 | Thiazole, 4,5-dimethyl- | 3581-91-7 | 2.52 |
| 27.71 | 2-(4-Nitrobutyryl)-cyclopentanone | 79630-91-4 | 0.36 |
| 29.82 | Furfuryl sulfide | 13678-67-6 | 1.18 |

TABLE 07-3

The major volatile substances of sample 19

| RT(min) | Compound Name | CAS | peak areas percentage/% 0812-4 |
|---|---|---|---|
| 5.29 | Furfural | 98-01-1 | 77.90 |
| 8.03 | 3-Mercaptohexyl butanoate | 136954-21-7 | 0.16 |
| 12.68 | Nonanal | 124-19-6 | 0.09 |
| 12.90 | 1-Propene, 1-(ethylthio)-2-methyl- | 27482-14-0 | 0.12 |
| 17.00 | 2-Thiopheneacetic acid, á-amino-,(ñ)- | 21124-40-3 | 0.45 |
| 17.63 | 3-Acetyl-2,5-dimethylthiophene | 2530-10-1 | 0.21 |
| 17.81 | 5-(2-Hydroxyethyl)-4-methylthiazole | 137-00-8 | 0.83 |
| 20.17 | Bis(2-furfuryl) disulfide | 4437-20-1 | 6.07 |
| 22.19 | 2,5-Cyclohexadiene-1,4-dione, 2,6-bis(1,1-dimethylethyl)- | 719-22-2 | 0.47 |
| 22.42 | 2,6-Di-tert-butyl-4-hydroxy-4-methylcyclohexa-2,5-dien-1-one | 10396-80-2 | 0.08 |
| 23.58 | 2,4-Di-tert-butylphenol | 96-76-4 | 0.09 |
| 23.92 | Furan, 3,3'-dithiobis[2-methyl- | 28588-75-2 | 0.73 |
| 24.42 | Cyclopentanethiol, 1-methyl- | 1638-95-5 | 0.92 |
| 27.71 | 2-(4-Nitrobutyryl)-cyclopentanone | 79630-91-4 | 2.26 |
| 28.11 | | | |

CONCLUSION

There are many meaty flavour compounds detected in both samples of MRPs include but not limited to furfural, 2-methyl-3-furanthiol, 2-furfurylthiol, 2-thiophenethiol, 2,5-thiophenedicarboxaldehyde, furan, 3,3'-dithiobis[2- methyl-, barbituric acid, 2-thio-, nonanal, bis(2-furfuryl) disulfide, 2,4-di-tert-butylphenol, 2-(4-nitrobutyryl)-cyclopentanone. These products play the important role to improve the taste profile of plant-based meat. An embodiment of a plant-based meat comprises these flavour compounds.

Surprisingly, the aim of this invention is to mock authentic meat, the mean sensory evaluation results obtained from the taste test with authentic burger patty under blind conditions were lower than the mean scores achieved by the plant-based meat burger patties with MRPs added. This effectively shows the huge flavour improvements the addition of MRPs have made on plant-based meat. In conclusion, the addition of Maillard reaction products (MRPs) formed from a reaction mixture comprising a sulphur-containing amino compound and sugar donor can significantly improve the overall meaty flavour of plant-based meat. The invention provides a method to improve the palatability of plant-based meat. The comparison between the sensory evaluation results of plant-based meat patties with MRP added and authentic meat patty shows that the panellists, in general, perceive plant-based meat with MRP's added as more palatable. This might be because that the amounts of key meaty flavour MRPs compounds found in cooked authentic meat are not as high. Therefore, this technology may also be applicable to be added in authentic meat to improve its flavour.

The optimum reaction time and temperature found in the research, which is at 100° C. for 1.5 hours is much lower and shorter in comparison with the conventional time range used by the industry to produce meat flavour products (generally around 120° C. for over 1 hour). Based on literature research, the GC-MS results show that it was mainly the initial stage of the Maillard reaction that took place in the reaction mixtures. The products are essential amadori compounds for the further thermal reactions after the precursors are added to the plant-based meat as it's being cooked. Leading to the production of meaty flavour compounds in the final food product in large quantities. An embodiment of plant-based meat comprises amadori compounds.

Texture is also an important aspect of the overall flavour of food. Texture refers to "those qualities of a food that can be felt with the fingers, tongue, palate, or teeth". Food texture plays a crucial role in product and consumer acceptability. It's still hard for plant-based meat products to replicate meat's texture exactly as the muscle fibre components, connective tissues, and lipids all contribute greatly to consumers' perception of authentic meat. By comparing the sensory evaluation results of the control (plain plant-based meat patty) with plant-based meat patties with MRPs added, a decrease the score of granular texture is shown. This suggests that the meat-like aromas produced by the MRPs are able to mask out some of the defects in plant-based meat's texture and improve consumers' perceptions of plant-based meat's texture significantly. An embodiment of a method by using MRPs to improve the meat texture of plant-based meat. Comparison of the attribute "Granular texture" between samples 18 and 19 is shown in Table 07-4 below.

TABLE 07-4

| Comparing the attribute "Granular texture" between samples | |
| --- | --- |
| i. | ii. Granular texture |
| Sample 18(with cysteine MRP) | 1.42 |
| Sample 19(with thiamine MRP) | 1.42 |
| Plant-based meat | 1.58 |

The invention claimed is:

1. A plant-based meat composition, comprising:

(1) a plant-based meat product; and (2) an added Maillard reaction product (MRP) formed from a Maillard reaction mixture comprising:

(a) one or more sugar donors; and (b) one or more amine donors having a free amino group, wherein component (a) and component (b) are present in the Maillard reaction mixture in a molar ratio of 10:1 to 1:10, wherein (a) and (b) undergo Maillard reaction in the absence of the plant-based meat product, wherein the one or more sugar donors comprise xylose and the one or more amine donors comprise cysteine or methionine, wherein the added MRP comprises compounds selected from the group consisting of furfural, 2-methyl-3-furanthiol, 2-furfurylthiol, 2-thiophenethiol, 2,5-thiophenedicarboxaldehyde, 3,3'-dithiobis[2-methylfuran], 2-thiobarbituric acid, nonanal, bis(2-furfuryl)disulfide, 2,4-di-tert-butylphenol, and 2-(4-nitrobutyryl)-cyclopentanone, wherein the added MRP is present in a concentration range of 0.0001-10 wt. % of the plant-based meat composition, wherein the plant-based meat composition has decreased off-taste compared to the plant-based meat product, and wherein the off-taste is selected from the group consisting of bitter taste, licorice-like taste, metallic taste, astringent taste, delayed sweetness onset and lingering sweet aftertaste.

2. The plant-based meat composition of claim 1, wherein (a) and (b) undergo Maillard reaction at a temperature in the range of 60° C. to 250° C.

3. The plant-based meat composition of claim 1, further comprising a high intensity sweetener.

4. The plant-based meat composition of claim 3, wherein the high intensity sweetener is selected from the group consisting of high intensity synthetic sweeteners, non-mogroside natural sweeteners, and glycosylation products thereof.

5. The plant-based meat composition of claim 1, wherein the one or more sugar donors comprise a sugar donor selected from the group consisting of plant juices/powders, vegetable juices/powders, berries juices/powders and fruit juices/powders.

6. A method for improving a taste profile of a plant-based meat product, comprising:

adding a Maillard reaction product (MRP) composition during preparation of the plant based meat product to produce a final product, wherein the MRP composition is produced by heating a reaction mixture comprising:

(a) one or more sugar donors; and (b) one or more amine donors having a free amino group, wherein component (a) and component (b) are present in the Maillard reaction mixture in a molar ratio of 10:1 to 1:10, wherein (a) and (b) undergo Maillard reaction in the absence of the plant-based meat product, wherein the one or more sugar donors comprise xylose and the one or more amine donors comprise cysteine or methionine, wherein the added MRP composition comprises compounds selected from the group consisting of furfural, 2-methyl-3-furanthiol, 2-furfurylthiol, 2-thiophenethiol, 2,5-thiophenedicarboxaldehyde, 3,3'-dithiobis[2-methylfuran], 2-thiobarbituric acid, nonanal, bis(2-furfuryl)disulfide, 2,4-di-tert-butylphenol, and 2-(4-nitrobutyryl)-cyclo-pentanone, wherein the added MRP is present in a concentration range of 0.0001-10 wt. % of the plant-based meat composition, wherein addition of the MRP composition decreases an off-taste of the plant-based meat product, and wherein the off-taste is selected from the group consisting of bitter taste, licorice-like taste, metallic taste, astringent taste, delayed sweetness onset and lingering sweet aftertaste.

7. The method of claim 6, wherein (a) and (b) undergo Maillard reaction at a temperature in the range of 60° C. to 250° C.

8. The method of claim 6, wherein the one or more sugar donors comprise a sugar donor selected from the group consisting of plant juices/powders, vegetable juices/powders, berries juices/powders and fruit juices/powders.

* * * * *